(12) United States Patent
Rogers

(10) Patent No.: US 11,085,570 B2
(45) Date of Patent: Aug. 10, 2021

(54) RETAINING SLEEVE FOR HIGH PRE-CHARGE CARTRIDGE

(71) Applicant: Performance Pulsation Control, Inc., Richardson, TX (US)

(72) Inventor: John Thomas Rogers, Garland, TX (US)

(73) Assignee: Performance Pulsation Control, Inc., Richardson, TX (US)

( * ) Notice: Subject to any disclaimer, the term of this patent is extended or adjusted under 35 U.S.C. 154(b) by 123 days.

(21) Appl. No.: 16/448,678

(22) Filed: Jun. 21, 2019

(65) Prior Publication Data
US 2019/0390813 A1    Dec. 26, 2019

Related U.S. Application Data

(60) Provisional application No. 62/689,518, filed on Jun. 25, 2018.

(51) Int. Cl.
*F16L 55/05* (2006.01)

(52) U.S. Cl.
CPC .................... *F16L 55/05* (2013.01)

(58) Field of Classification Search
CPC ......... F16L 55/05; F16L 55/04; F16L 55/041; F16L 55/043; F16L 55/045; F16L 55/053; F16L 55/052
USPC .................................................... 138/26, 30
See application file for complete search history.

(56) References Cited

U.S. PATENT DOCUMENTS

| | | | | |
|---|---|---|---|---|
| 2,968,319 A * | 1/1961 | Ball | ...................... | F16L 55/053 138/30 |
| 3,486,530 A * | 12/1969 | Mercier | ................ | F24D 3/1008 138/30 |
| 3,672,398 A * | 6/1972 | Ichiryu | ............... | F04B 11/0016 137/565.34 |
| 3,893,485 A * | 7/1975 | Loukonen | ............. | F16L 55/053 138/30 |
| 4,442,866 A * | 4/1984 | Loukonen | ............. | F16L 55/053 138/104 |
| 4,497,388 A * | 2/1985 | Dexter | .................. | F16L 55/053 138/30 |
| 4,979,441 A | 12/1990 | Welch et al. | | |
| 5,860,452 A | 1/1999 | Ellis | | |
| 6,164,336 A * | 12/2000 | Pasquet | ................. | F16L 55/052 138/30 |
| 6,651,698 B1 * | 11/2003 | Wilkes | .................. | F16K 47/023 138/26 |

(Continued)

OTHER PUBLICATIONS

Notification of Transmittal of the International Search Report and the Written Opinion of the International Searching Authority, or the Declaration, dated Sep. 12, 2019, in connection with International Application No. PCT/US2019/038554, 7 pages.

*Primary Examiner* — Patrick F Brinson

(57) ABSTRACT

A gas charged cartridge for use with a cylinder to form a pulsation control dampener is provided. The cylinder receives a fluid for the pulsation control dampener. The gas charged cylinder can include a head, a plug, an elastomer composite, and a perforated retaining sleeve. The head is located on a first end of the gas charged cartridge. The plug is located on a second end of the gas charged cartridge. The elastomer composite connects the head to the plug. The perforated retaining sleeve is affixed to the plug surrounding the elastomer composite.

20 Claims, 14 Drawing Sheets

(56) References Cited

U.S. PATENT DOCUMENTS

| | | | |
|---|---|---|---|
| 10,508,763 B2* | 12/2019 | Rogers | B01D 29/11 |
| 2003/0226607 A1* | 12/2003 | Young | F16L 55/053 |
| | | | 138/30 |
| 2012/0145495 A1 | 6/2012 | Suciu | |
| 2015/0096639 A1 | 4/2015 | Rogers et al. | |

* cited by examiner

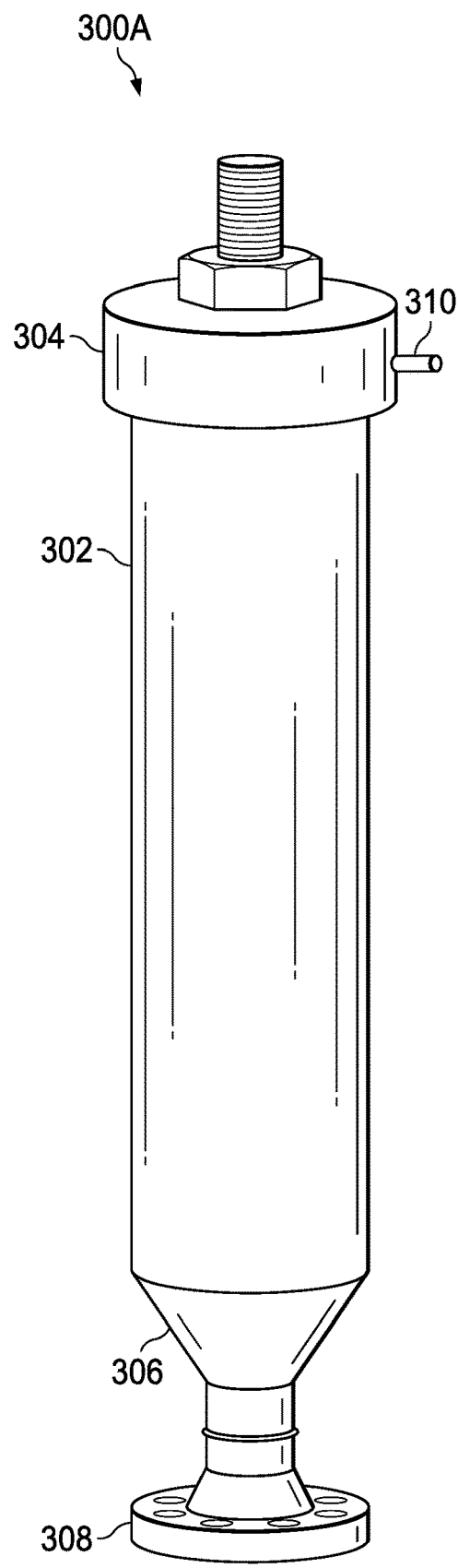
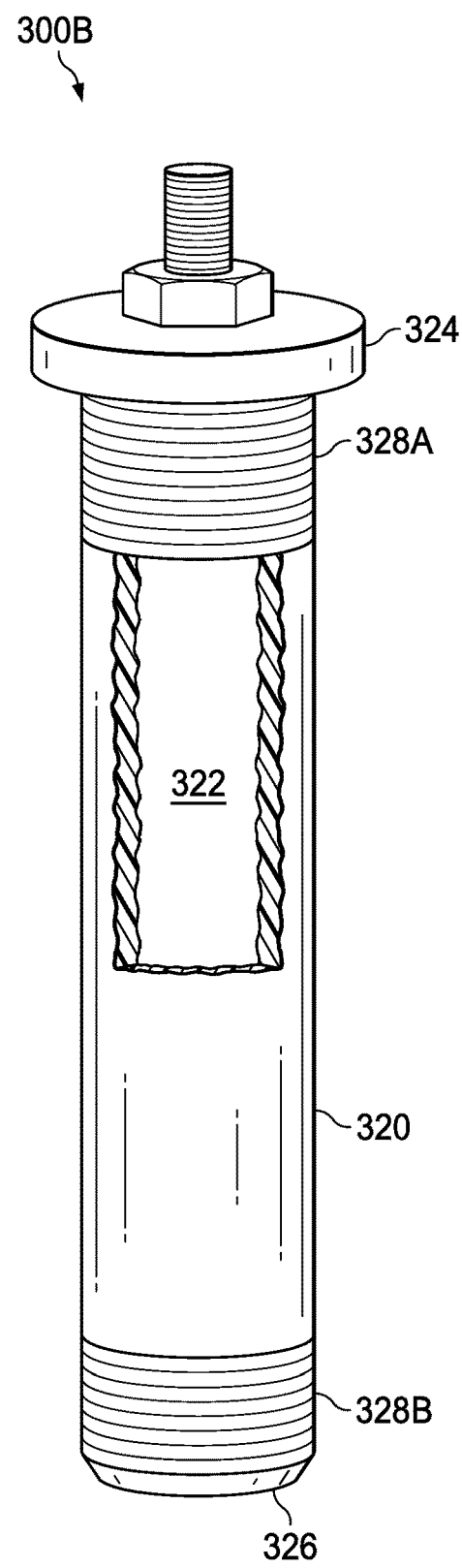
FIG. 3A
FIG. 3B

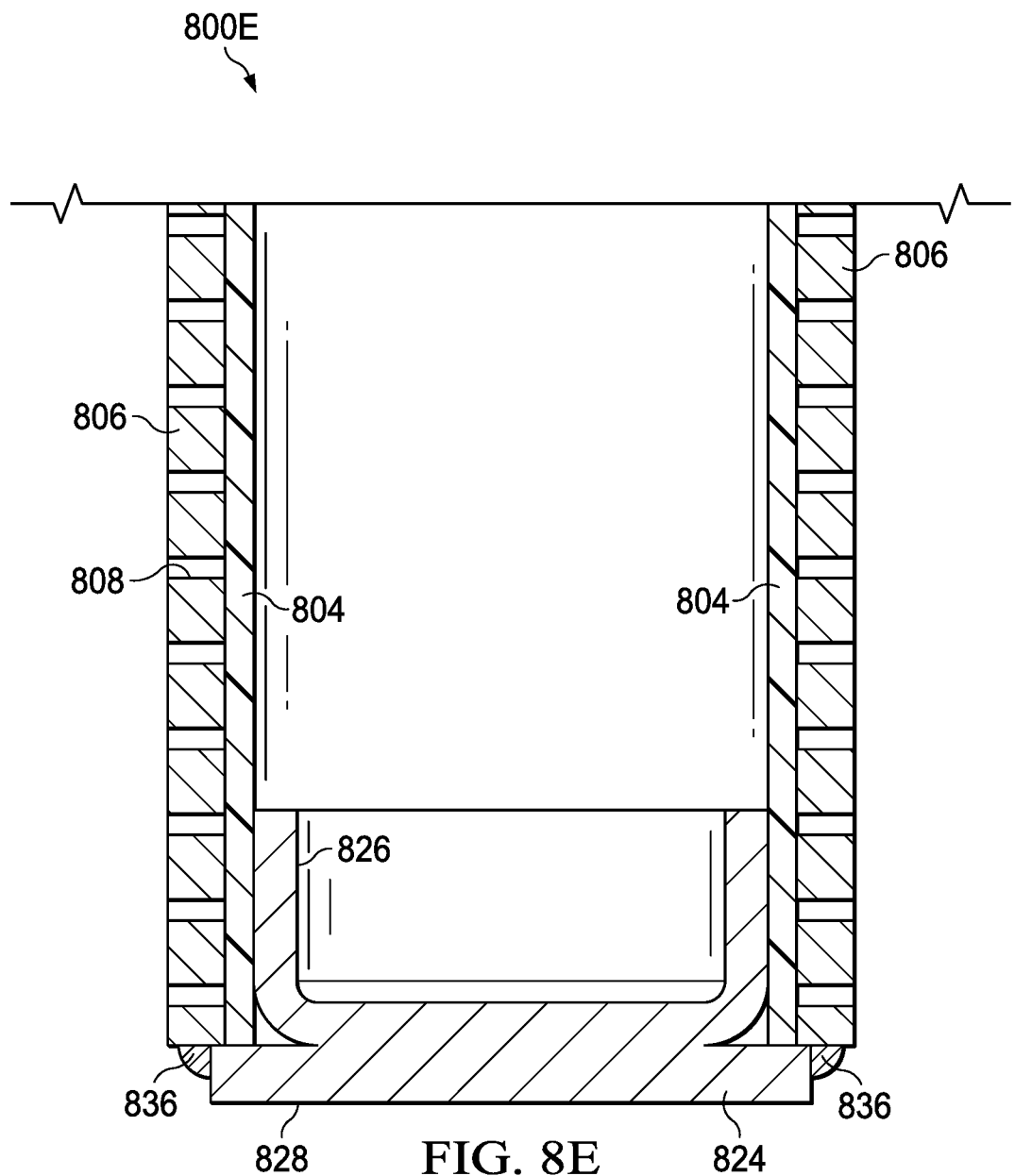

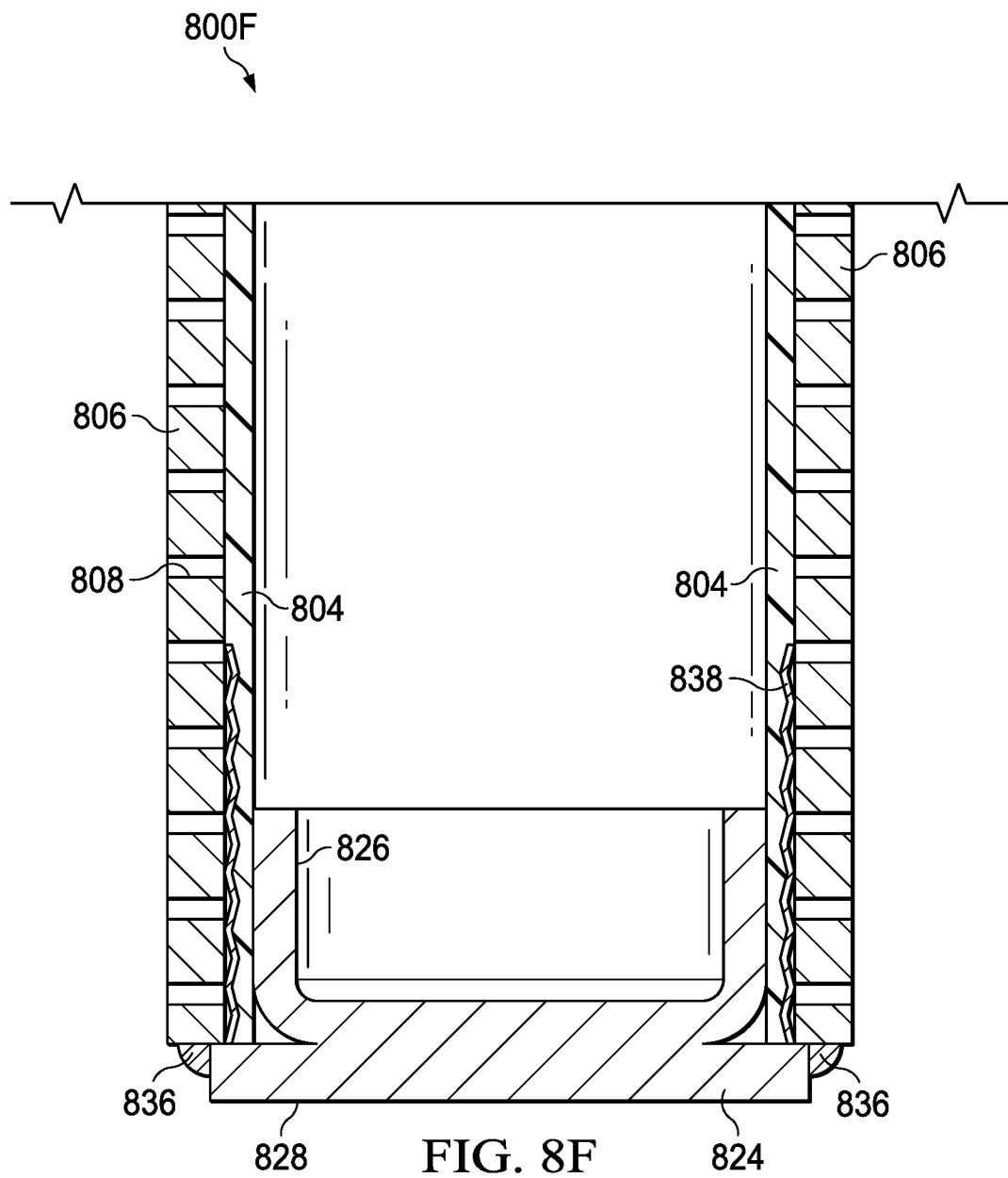

RETAINING SLEEVE FOR HIGH PRE-CHARGE CARTRIDGE

CROSS-REFERENCE TO RELATED APPLICATION AND CLAIM OF PRIORITY

This application claims priority under 35 U.S.C. § 119(e) to U.S. Provisional Patent Application Ser. No. 62/689,518 filed on Jun. 25, 2018. The above-identified provisional patent application is hereby incorporated by reference in its entirety.

TECHNICAL FIELD

This disclosure relates generally to the operation of reciprocating pump fluid transfer systems. More specifically, this disclosure relates to a pulsation control dampener with a cartridge retaining sleeve.

BACKGROUND

Pulsation control in reciprocating pump fluid transfer systems is in constant need of improvement. Among the desirable improvements are reduced pulsation amplitudes to the pumps and from pumps to the downstream system as well as greater flexibility in integration of pulsation control dampeners with other elements of an overall pump system.

SUMMARY

This disclosure provides retaining sleeve for high pre-charge cartridge for a pulsation control discharge dampener.

In one embodiment, a gas charged cartridge for use with a cylinder to form a pulsation control dampener is provided. The gas charged cylinder can include a head, a plug, an elastomer composite, and a perforated retaining sleeve. The head is located on a first end of the gas charged cartridge. The plug is located on a second end of the gas charged cartridge. The elastomer composite connects the head to the plug. The perforated retaining sleeve is affixed to the plug surrounding the elastomer composite.

In one embodiment, a pulsation control dampener is provided. The pulsation control dampener includes a gas charged cartridge and a cylinder. The cylinder receives a fluid for the pulsation control dampener. The gas charged cylinder can include a head, a plug, an elastomer composite, and a perforated retaining sleeve. The head is located on a first end of the gas charged cartridge. The plug is located on a second end of the gas charged cartridge. The elastomer composite connects the head to the plug. The perforated retaining sleeve is affixed to the plug surrounding the elastomer composite.

In any of the above embodiments, the perforated retaining sleeve also connects to the head may be included.

In any of the above embodiments, the perforated retaining sleeve extends a partial length of the elastomer composite, and the gas charged cartridge further includes a crimping sleeve configured to secure the perforated retaining sleeve to the elastomer composite may be included.

In any of the above embodiments, the gas charged cartridge further includes a crimping sleeve configured to secure the elastomer composite to the plug; and a retaining plate coupled to a base of the plug, where the perforate retaining sleeve is affixed to the retaining plate may be included.

In any of the above embodiments, the plug includes a cup portion and a base portion extending from the cup portion may be included.

In any of the above embodiments, the gas charged cartridge further includes a crimping sleeve configured to secure the elastomer composite to cup portion of the plug, and the perforated retaining sleeve is coupled to the base portion of the plug may be included.

In any of the above embodiments, an inside circumference of the perforated retaining sleeve is coupled on an outside circumference of the base portion of the plug may be included.

In any of the above embodiments, a base of the perforated retaining sleeve couples to an outside circumference of the base portion of the plug may be included.

In any of the above embodiments, the gas charged cartridge further includes a crimping sleeve configured to secure the perforated retaining sleeve to the elastomer composite and secure both to the cup portion of the plug may be included.

In any of the above embodiments, a crimping sleeve molded to an outer diameter of the elastomer composite may be included.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. The terms dampener and stabilizer may be used interchangeably.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 3A illustrates an external view of a pulsation control dampener according to various embodiments of the present disclosure;

FIG. 3B illustrates an external view of a pulsation control dampener cartridge according to various embodiments of the present disclosure;

FIGS. 8A-8G illustrate cross sectional views of a bottom portion of a pulsation control stabilizer cartridge with a perforated retraining sleeve according to various embodiments of the present disclosure.

DETAILED DESCRIPTION

Figure 1:
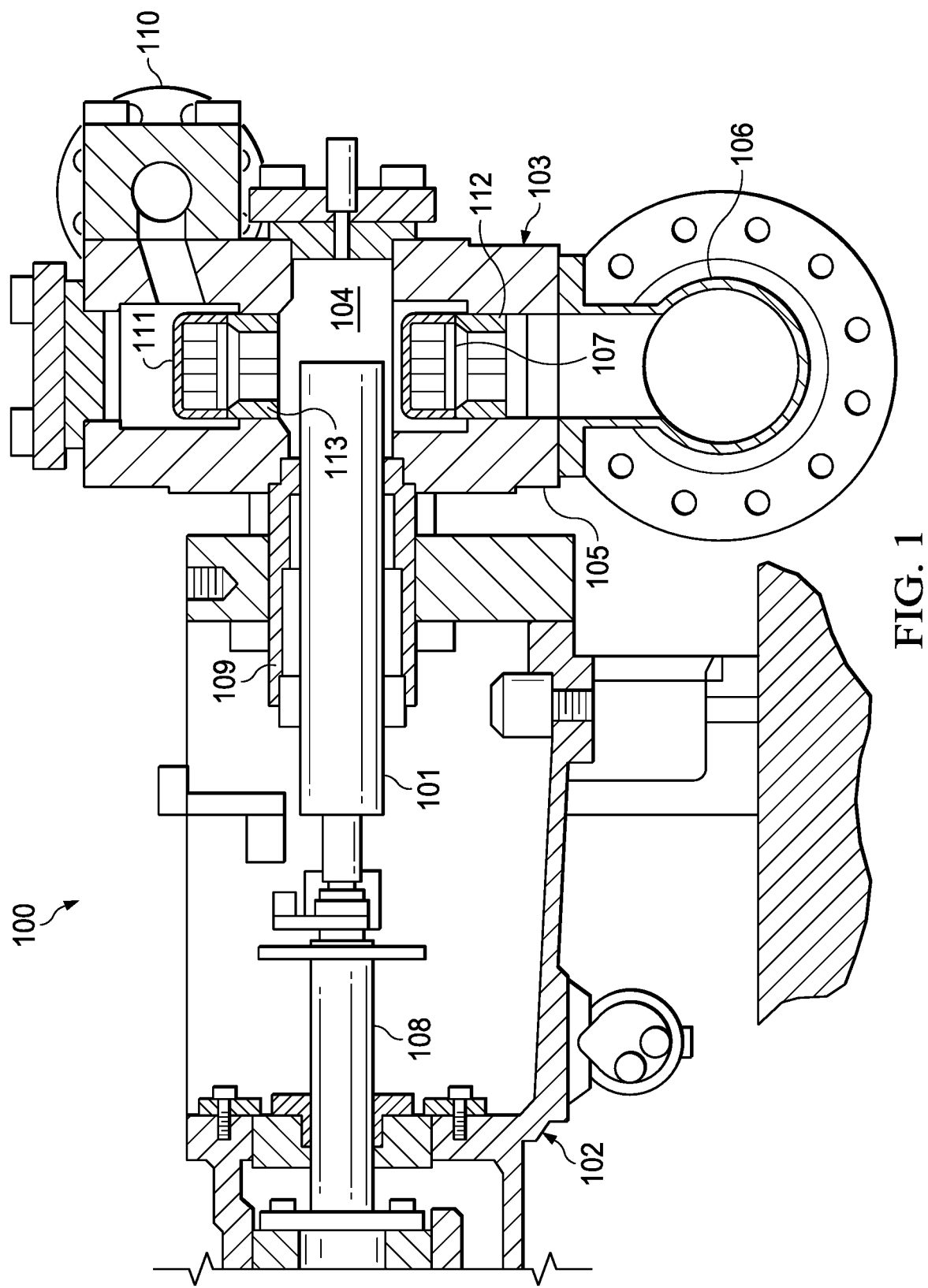
FIG. 1 illustrates a simplified cross-sectional and somewhat schematic view of a reciprocating pump system employed within pulsation control dampener system with multiple flow paths according to an embodiment of the present disclosure.

FIGS. 1 through 8G, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged piping manifold dampener that can be used to control or partially control pulsation amplitudes.

Reciprocating systems, such as reciprocating pump systems and similar equipment, operate in many types of cyclic hydraulic applications. For example, reciprocating mud pump systems are used to circulate the mud or drilling fluid on a drilling rig. Pressure peaks, as well as the magnitude of pressure pulsations within the pumped fluid, hasten the deterioration of the pump, the pump's fluid end expendable parts, and equipment downstream from the pump, such as measurement equipment used to determine drilling parameters. Failure to control such pressure peaks and the magnitude of the pulsation inevitably affects the operating performance and operational life of the pump, pump fluid end expendable parts, and all upstream or downstream components. Pressure peaks and magnitude of the pressure pulsations may also interfere with instrument signal detection, such that failure to control pressure peaks and magnitude of the pressure pulsations may also affect the signal detection and/or quality of the signal detection in, for example, measurement during drilling operations.

Pulsations are the sudden change in pressure within a closed system when fluid velocities increase and decrease in a constant friction piping system resulting in pressure changes and also the acceleration or deceleration of the fluid as a result of valves opening and closing. Since fluid is not easily compressible, any force applied to the fluid by a pump can be accounted for. The pump produces variable energy in the fluid from its reciprocating motion and its valves opening and closing. The variations can become extreme and cause damage to upstream or downstream components depending on the location of the high variations. It can also cause damage, such as cavitation, inside the fluid end cylinder of the pump. Additionally, the pressure variations can be increased when the pump lacks a proper suction flow. For example, if the pump lacks a proper suction flow, as the pump's piston moves from a retracted position to a forward, the piston can impact the fluid creating a pressure variation in the fluid.

Pulsation control equipment is typically placed immediately upstream, downstream, or both from a reciprocating pump, often with a relative size and configuration proportional to the volume of desired fluid displacement per stroke of the pump and the maximum allotted magnitude of the pressure peaks and magnitude of the pressure pulsations that may be experienced by the pump system during each pulsation. Pulsation control equipment aids in reducing pump loads and minimizing pulsation amplitudes to the pump, the pump's fluid end expendable parts, and to equipment upstream or downstream from the pump. As a result, pulsation control equipment improves the relative operating performance and life of the pump, the pump's fluid end expendable parts, and any equipment upstream or downstream from the pump.

Different pulsation dampening systems have been developed, including gas-charged dampeners. Common types of pulsation control dampeners are a hydro-pneumatic dampener, or a gas-charged pressure vessel (containing compressed air or nitrogen and a bladder or bellows that separates the process fluid from the gas charge). Most commonly cylindrical or roughly spherical, gas-charged pulsation control dampeners may be either flow through or appendage type devices. To optimize the pulsation dampening effect, it is often preferable that the pulsation control dampener be installed as close as possible to the pump discharge. At such locations, however, the presence of the pulsation control dampener may interfere with installation of other system components, such as a strainer or a cross. In addition, the gas-charged pulsation control dampener design typically requires that the gas pre-charge in the cartridge or bladder be appropriately below the normal system pressure, and that the pulsation control dampener be properly sized with the correct gas volume for the system operating conditions to meet a desired pulsation level performance. An undersized dampener cannot adequately compensate for pressure and flow fluctuations, while an oversized dampener will act as an accumulator, storing too much fluid and causing slow stabilization and delayed response to system changes.

Regardless of the type of dampener, the performance of the dampener diminishes when the pressure of the drilling fluid from the pump is not within the pressure range that the dampener is designed to handle. For example, even when a pulsation control dampener is installed in a drilling system, pulsations may be experienced further downstream from the pumps as the pressure of the fluid within the pipeline is ramping-up to a pressure suitable for the drilling operation. These downstream pulsations can cause damage to the various downstream components (both equipment and sensors), increase audible noise, increase noise in sensor readings related to the drilling operation, and reduce performance of the drilling operation when the pressure of the system is not within the pressure range the pulsation control dampener is designed to handle.

FIG. 1 illustrates a simplified cross-sectional and somewhat schematic view of a reciprocating pump system 100 employed within a pulsation control dampener system with multiple flow paths, according to an embodiment of the present disclosure. Generally, the reciprocating pump system 100 includes a pump suction and/or discharge pulsation control product including a gas-charged pulsation control dampener or a reactive pulsation control dampener according to an embodiment of the present disclosure. The reciprocating pump system 100 may employ a reciprocating pump of a type well-known and commercially available. The pump within the reciprocating pump system 100 is configured to reciprocate one or more pistons or plungers 101 (only one shown in FIG. 1). Each piston or plunger 101 is preferably connected by a suitable rotatable crankshaft (not shown) mounted in a suitable "power end" housing 102. Power end housing 102 is connected to a fluid end structure 103 configured to have a separate pumping chamber 104 for each piston or plunger 101. Pumping chamber 104 is exposed to its respective piston or plunger 101. One such pumping chamber 104 is shown in FIG. 1.

More specifically, FIG. 1 illustrates a simplified cross-sectional view through a typical pumping chamber 104. Fluid end structure 103 includes housing 105. Pumping chamber 104 receives fluid from inlet manifold 106 by way of a conventional poppet type inlet or suction valve 107 (only one shown). Piston or plunger 101, projecting at one end into pumping chamber 104, connects to a suitable crosshead mechanism, including crosshead extension member 108. Crosshead extension member 108 is operably connected to a crankshaft or eccentric (not shown) in a known manner. Piston or plunger 101 also projects through a conventional liner or through conventional packing 109, respectively. Each piston or plunger 101 is preferably configured to pumping chamber 104. Each piston or plunger 101 is also operably connected to inlet manifold 106 and discharge piping manifold 110 by way of a suitable suction valve 107 or discharge valve 111, as shown. Inlet manifold 106 can include a suction piping manifold that typically receives fluid from suction stabilizer (not shown in FIG. 1) or a suction piping with a suction stabilizer. Discharge piping manifold 110 typically discharges into a discharge dampener (not shown in FIG. 1). Valves 107 and 111 are of conventional design and typically spring biased to their respective closed positions. Valves 107 and 111 each also may include or be associated with removable valve seat members 112 and 113, respectively. Each of valves 107 and 111 may preferably have a seal member (not shown) formed thereon to provide fluid sealing when the valves are in their respective closed and seat engaging positions.

Those skilled in the art will recognize that the techniques of the present disclosure may be utilized with a wide variety of single and multi-cylinder reciprocating piston or plunger power pumps as well as possibly other types of positive displacement pumps. As one example, the number of cylinders of such pumps may vary substantially between a single cylinder and essentially any number of cylinders or separate pumping chambers. Those skilled in the art will also recognize that the complete structure and operation of a suitable pump system is not depicted or described herein. Instead, for simplicity and clarity, only so much of a pump system as is unique to the present disclosure or necessary for an understanding of the present disclosure is depicted and described.

Figure 2:
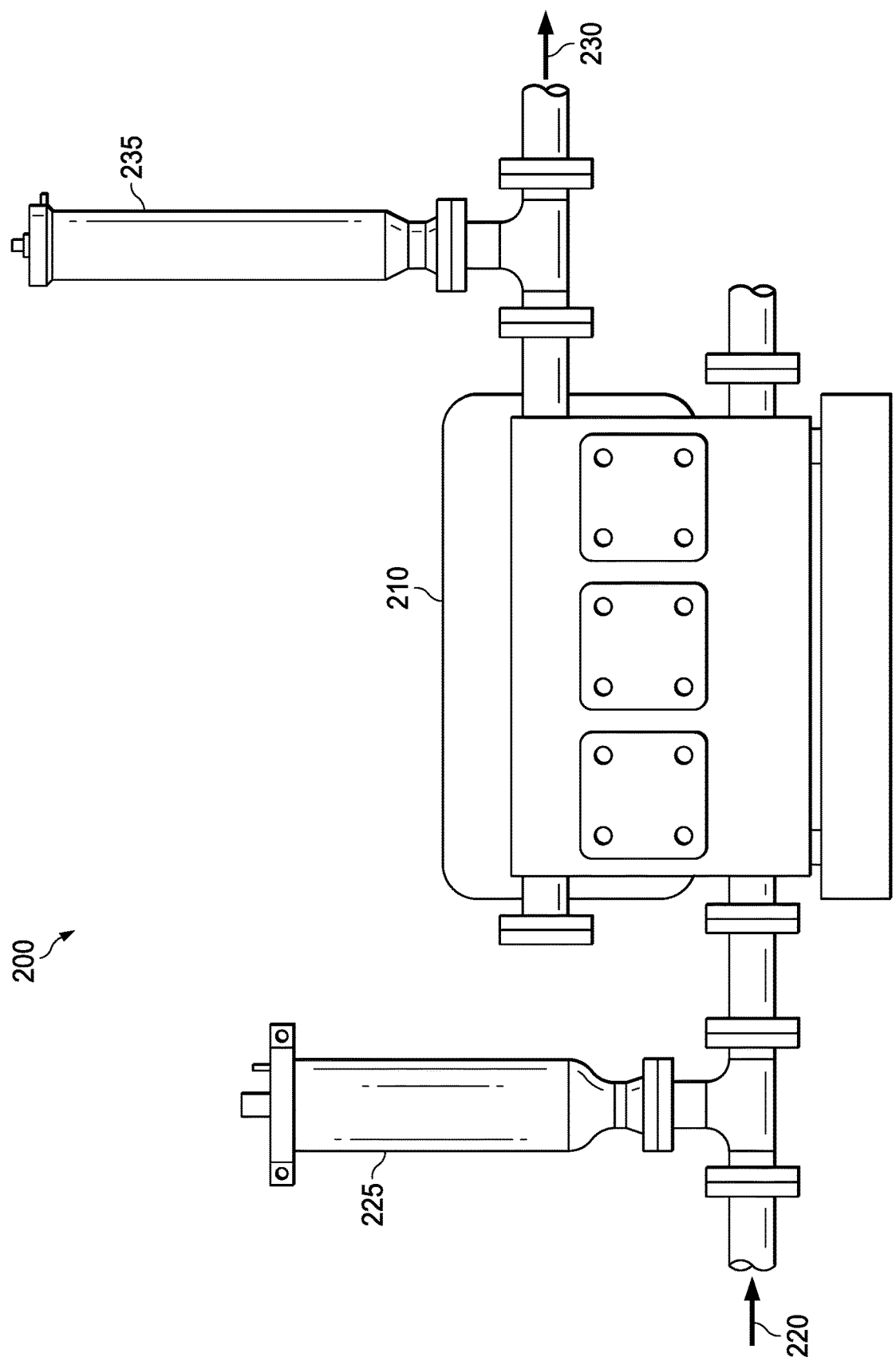
FIG. 2 illustrates an example location of a pulsation suction stabilizer and a pulsation discharge dampener in relation to a pump according to various embodiments of the present disclosure.

Conventional pump systems, such as the reciprocating pump system 100 shown in FIG. 1, typically include pulsation control products such as a discharge dampener, a suction dampener, or both. FIG. 2 illustrates an example location of a pulsation control suction stabilizer and a pulsation control discharge dampener in relation to a pump according to various embodiments of the present disclosure. In particular FIG. 2 illustrates a fluid delivery and pulsation dampening system 200 according to various embodiments of the present disclosure. FIG. 2 illustrates an example location of a pulsation suction stabilizer 225 and a pulsation discharge dampener 235 in relation to a pump 210. Pump 210 is similar to the reciprocating pump system 100 of FIG. 1.

Fluid enters the pump 210 at inlet 220 and exits the pump at discharge 230. Inlet 220 is referred to as the suction end of the pump 210, as the fluid is sucked into the pump, and the fluid is discharged via discharge 230 to downstream components and equipment. Pulsation control suction stabilizer 225 stabilizes and dampens the fluid as it enters the pump 210, while the pulsation control discharge dampener 235 stabilizes and dampens the fluid as it exits the pump 210. Pulsation control suction stabilizer 225 dampens fluid prior to entering the pump 210 to provide a steady flow of the fluid into the pump 210. Pulsation control suction stabilizer 225 also reduces pulsation levels in the manifold and inside the pump. Pulsation control discharge dampener 235 dampens fluid pulsations inside the pump and pump manifold, and as it exits the pump, to provide reduced pulsation and flow variations towards the downstream equipment and components. In certain embodiments, pulsation control suction stabilizer 225 or pulsation control discharge dampener 235 is omitted from the pulsation dampening system 200.

Pulsation control stabilizers 225 and 235 are sized based on the capacity of the pump 210, the fluid type, the temperature of the fluid, the operating system pressure, the diameter of the plunger or piston of the pump 210, the stroke length of the pump 210, and the like. Pulsation control stabilizers 225 and 235 can be sized differently.

Figure 3C:
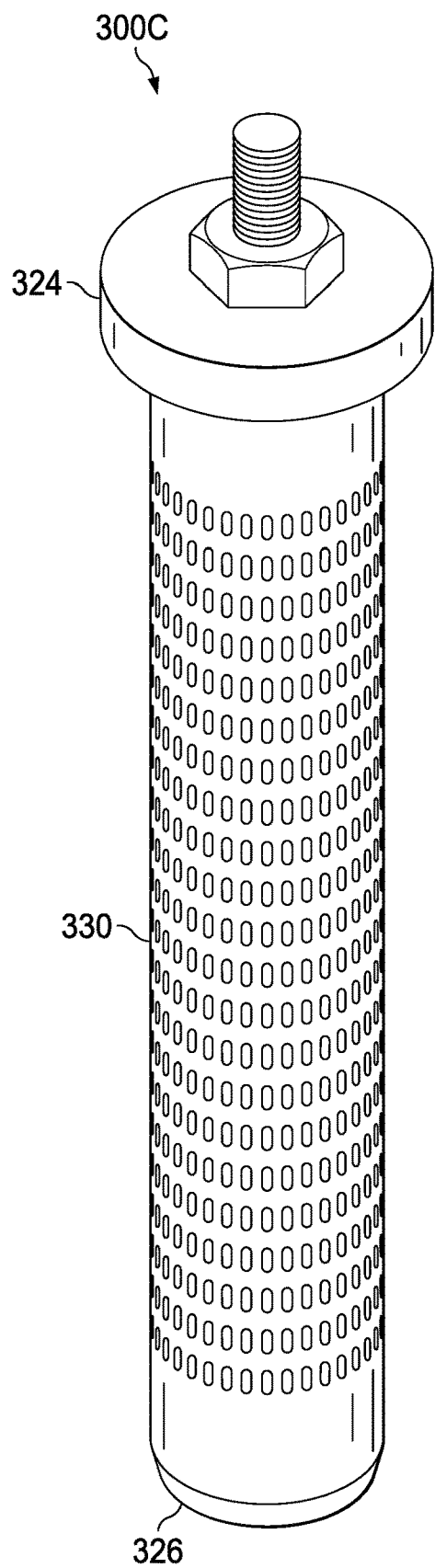
FIG. 3C illustrates an external view of a pulsation control dampener cartridge with a perforated retaining sleeve according to various embodiments of the present disclosure.

FIG. 3A illustrates an external view of a gas charged pulsation control stabilizer according to various embodiments of the present disclosure. FIG. 3A illustrates a gas charged pulsation control stabilizer 300A. Pulsation control stabilizer 300A is similar to the pulsation control stabilizers 225 and 235 of FIG. 2. Pulsation control stabilizer 300A acts as an energy absorber to pressure pulsations in the fluid. As shown with respect to FIGS. 3B, 3C, 3D and 4 below, the pulsation control stabilizer 300A includes an elastomer composite gas filled cartridge. When the gas filled cartridge is presented with a pressure variation, the gas within the cartridge compresses or expands as it absorbs the pressure variations of the fluid.

Pulsation control stabilizer 300A includes a cylinder 302, a top ring 304, a concentric reducer 306, a flange connection 308, and a bleeder valve 310. The cylinder 302 has a height and a width sized to contain a gas filled cartridge, and based on the operating conditions of the closed pumping system. The top ring 304 is the connection for the gas filled cartridge. The flange connection 308 is the connection between the pulsation control stabilizer 300A and the pipe containing the fluid that is to be dampened. In certain embodiments, the flange connection 308 is threaded. The bleeder valve 310 provides a temporary opening in the closed system, allowing air or other substances to be removed from the system by way of pressure differences.

Figure 4:
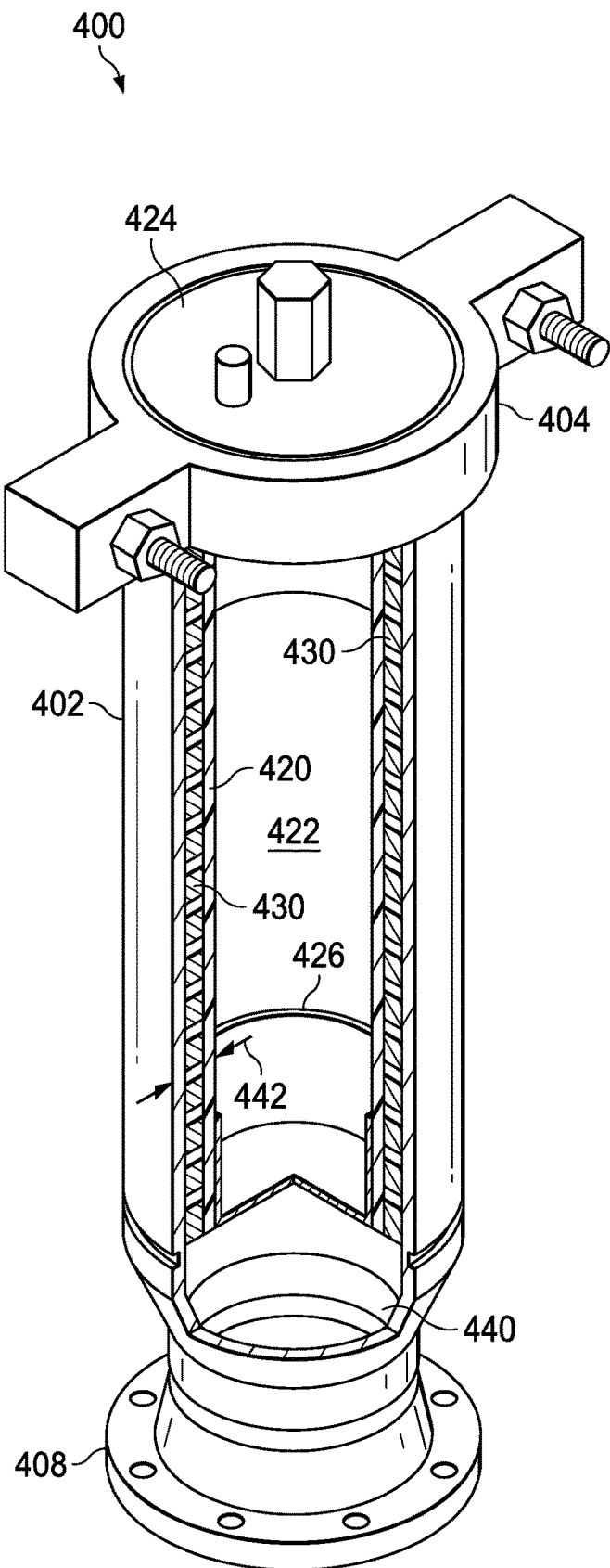
FIG. 4 illustrates a cut away view of a pulsation control dampener according to various embodiments of the present disclosure.
Figure 5:
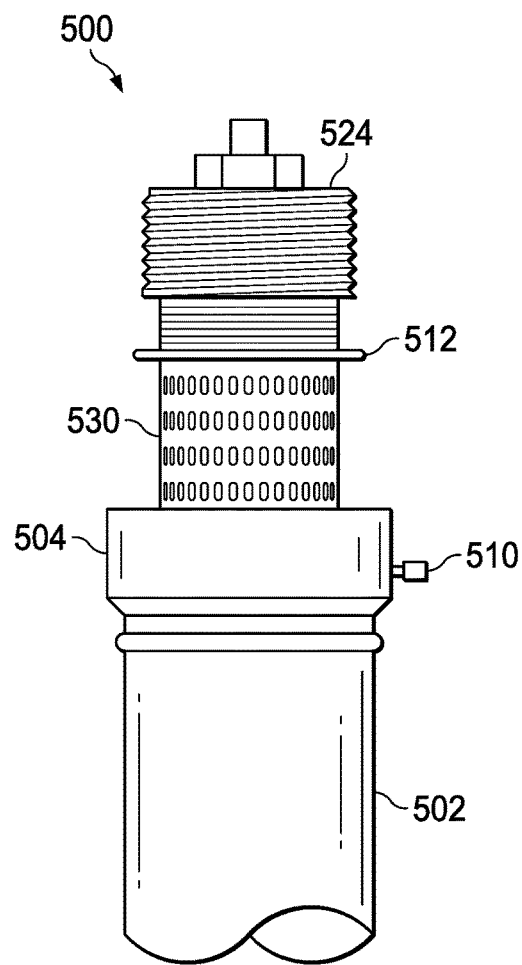
FIG. 5 illustrates an exploded view of a pulsation control dampener according to various embodiments of the present disclosure.

FIG. 3B illustrates an external view of a pulsation control stabilizer cartridge 300B according to various embodiments of the present disclosure. FIG. 3B illustrates a cartridge 300B. Cartridge 300B performs the dampening of pressure variations to the fluid. Cartridge 300B includes an elastomer composite 320, an internal volume 322 of the elastomer composite 320, a head 324, a plug 326, and crimping sleeves 328A and 328B. In certain embodiments, the head 324 and the plug 326 are metal. In certain embodiments, the head 324 and the plug 326 are bonded to the elastomer composite 320. In certain embodiments, the elastomer composite 320 is molded to the head 324 and the plug 326. In certain embodiments, the elastomer composite 320 includes cords to reinforce the elastomer composite 320 and against both high internal pressures and high external pressures. Cartridge 300B is placed in the stabilizer 300A as shown in FIGS. 4, and 5 below.

Figure 3D:
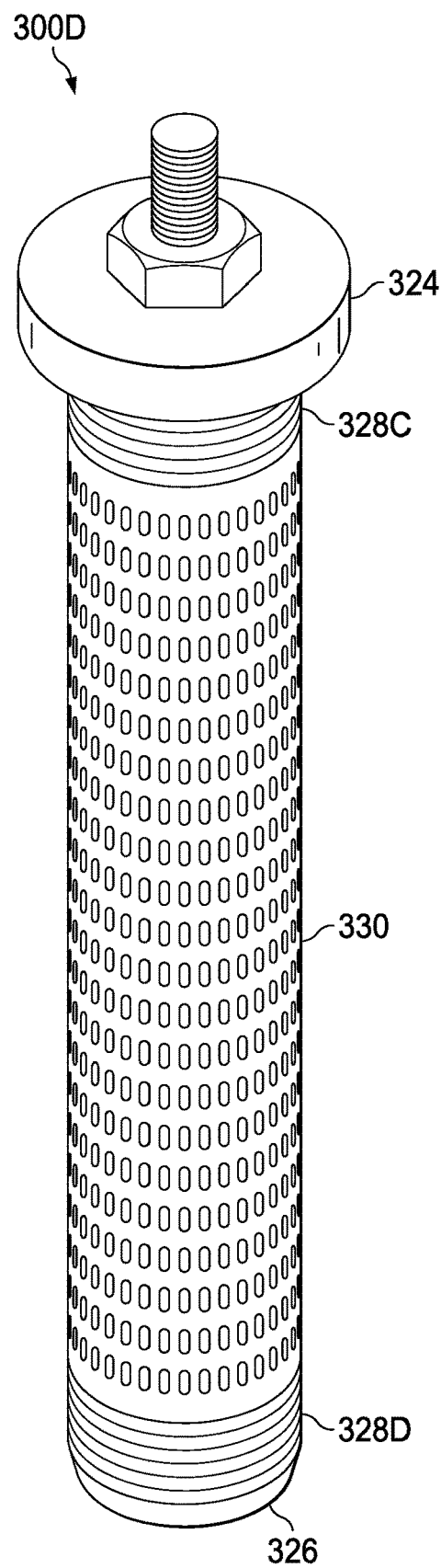
FIG. 3D illustrates an external view of a pulsation control stabilizer cartridge with a perforated retaining sleeve and an external crimping sleeve according to various embodiments of the present disclosure.

In certain embodiments, the elastomer composite 320 is cured and bonded to the head 324 and the plug 326. Thereafter, the elastomer composite 320, head 324 and the plug 326 are removed from the mold and a first sleeve 328A is slipped over and affixed by crimping to the elastomer composite 320 in proximity to the head 324 and a second sleeve 328B is slipped over and affixed by crimping to the to the elastomer composite 320 in proximity to the plug 326. The crimping of sleeves 328A and 328B create radially inward concentrated pressure locations that provide additional pressure forces to help secure the elastomer composite 320 to the head 324 and plug 326, respectively. In certain embodiments, the crimping sleeves 328A and 328B are affixed directly to the tube of the elastomer composite 320, as shown in FIGS. 3C, 7, 8A, 8B, and 8C. In certain embodiments, the crimping sleeves are affixed on top of a perforated retaining sleeve, as shown in FIGS. 3D, 8C, and 8D. The crimping sleeves can also be molded to the elastomer composite for full length or partially at the head or the plug.

The pulsation control stabilizer 300A is open on the bottom of the flange connection 308, allowing fluid from the piping system to enter and exit the pulsation control stabilizer 300A. Pressure variations contained within the fluid also enter the pulsation control stabilizer 300A and are dampened by the cartridge 300B. The head 324 of the cartridge 300B is affixed to the top ring 304 of the pulsation control stabilizer 300A. Therefore the head 324 is fixed and cannot move while the closed pumping system is operating. The plug 326 is attached to the head 324 via bonding of the elastomer composite 320 to head 324 and plug 326. The attachment of head 324 to the elastomer composite 320 by bonding is enhanced by crimping sleeve 328A, which applies pressure forces onto elastomer composite 320 and head 324. Similarly, the attachment of plug 326 to elastomer composite 320 by bonding is further enhanced by crimping sleeve 328B. The elastomer composite 320 is filled with gas. The internal pressure of the gas within the elastomer composite 320 is a pre-charge pressure. In certain embodiments, the gas is nitrogen. The elastomer composite 320 is sealed by the head 324 and the plug 326 to create an air tight cylinder. The seal is enhanced by the crimping bands.

In certain embodiments, when the elastomer composite 320 is filled with a gas, also called pre-charging, the internal pre-charge pressure can range from 100 PSI to 500 PSI. The cartridge 300B is selected to match the operating output pressure from a pump. For example, if the pressure of the fluid in the pipeline is at 2,500 PSI, then the cartridge 300B within the pulsation control stabilizer 300A could be pre-charged to a comparable pressure, such as 500 PSI, to reduce both high and low frequency pressure pulsations. The smaller the difference between the pressure of the fluid in the pipeline and the internal pressure of the cartridge 300B, the more efficient the cartridge 300B is at dampening pressure variations. Similarly, the larger the difference between the pressure of the fluid in the pipeline and the internal pressure of the cartridge 300B, the poorer the cartridge 300B is at dampening. Also, when the internal pressure of the cartridge 300B is larger than the pressure of the fluid in the pipeline, minimal pressure dampening is accomplished.

When the elastomer composite 320 is presented with a pressure variation, the gas within the cartridge compresses or expands effectively reducing pressure variations of the fluid. By the gas expanding and compressing, the circumference of the elastomer composite 320 can increase and decrease, thereby causing the plug 326 to move up and down the length of the cylinder 302 of the pulsation control stabilizer 300A.

The elastomer composite 320 is under large hoop stress and axial stress loads due to the frequent expansion and compression caused by pressure variations in the fluid. Hoop stress is a stress that is tangential to the direction of the elastomer composite 320. The hoop stress is the force exerted circumferentially, perpendicular both to the axis and to the radius of the object, in both directions on every particle in the cylinder wall of the elastomer composite 320. For example, any force applied to the cylindrical walls of the elastomer composite 320 by the internal pressure of the gas, as well as the external pressure of the fluid, creates hoop stress. Axial stress is a stress that is parallel to the axis of the cylinder. Axial stress is also at the location where the elastomer composite 320 is bonded to the head 324 and the plug 326. Any force applied to the head 324 or the plug 326 by a static pressure induces the axial stress on the elastomer composite 320.

The cartridge 300B often fails after a period of time due to the frequent expansion and compression caused by pressure variations in the fluid, as well as the hoop stress and axial stress loads, endured by the elastomer composite 320, the head 324, and the plug 326. For example, the elastomer composite 320 can burst due to the hoop stress. In another example, a leak can form between the elastomer composite 320 and the plug 326. As the plug 326 moves up and down, and as the elastomer composite 320 expands and compresses due to pressure variations, the bond between the plug 326 and the elastomer composite 320 can start to fail. Small holes or cracks are formed between the plug 326 and the elastomer composite 320, allowing the pre-charged gas to escape. The internal pressure of the cartridge 300B decreases as the gas escapes the cartridge, thereby decreasing the effectiveness of the cartridge 300B from reducing pressure pulsations within the fluid. In another example, the inside wall of the elastomer composite 320 can start to crack. If a cord of the elastomer composite 320 breaks free, the cord can cause an internal puncture of the homogenous rubber of the internal sleeve of the elastomer composite 320. The pre-charged gas can then escape the cartridge through the puncture. The internal pressure of the cartridge 300B decreases as the gas to escapes the cartridge.

FIG. 3C illustrates an external view of a pulsation control stabilizer cartridge with a perforated retaining sleeve according to various embodiments of the present disclosure. FIG. 3C illustrates a cartridge 300C. Cartridge 300C is similar to the cartridge 300B, with the addition of the perforated retaining sleeve 330. In certain embodiments, cartridge 300C can include crimping sleeves 328A and 328B, similarly installed as the crimping sleeves 328A and 328B illustrated in FIG. 3B, that are covered by the perforated retaining sleeve 330.

FIG. 3D illustrates an external view of a pulsation control stabilizer cartridge with a perforated retaining sleeve and an external crimping sleeve according to various embodiments of the present disclosure. FIG. 3D illustrates a cartridge 300D. Cartridge 300D is similar to the cartridge 300B, with the addition of the perforated retaining sleeve 330. Cartridge 300D is also similar to the cartridge 300C, with the addition of external crimping sleeves 328C and 328D. External crimping sleeves 328C and 328D are similar to crimping sleeves 328A and 328B of FIG. 3B, with the exception of their location. In particular, external crimping sleeves 328C and 328D are located externally of the perforated retaining sleeve 330, whereas crimping sleeves 328A and 328B covered by the perforated retaining sleeve 330, as shown in FIG. 3C. In certain embodiments, cartridge 300D can also include crimping sleeves 328A and 328B (not shown as they are covered by the perforated retaining sleeve 330) as well as crimping sleeves 328C and 328D (as shown). In certain embodiments, the perforated retaining sleeve 330 includes only external crimping sleeves 328C and 328D while the crimping sleeves 328A and 328B are omitted. A detailed view and description of the external crimping sleeves 328C and 328D is discussed below with respect to FIGS. 8C and 8D.

The perforated retaining sleeve 330 is external to the elastomer composite 320, depicted in FIG. 3B, and anchored on the head 324 and the plug 326. In certain embodiments, the perforated retaining sleeve 330 extends the entire length of the elastomer composite 320 and overlaps all or a portion of the outside diameter of elastomer composite 320 that has been bonded to the head 324 and the plug 326. In certain embodiments, the perforated retaining sleeve 330 covers a portion of the outside diameter of elastomer composite 320 bonded to the head 324. In certain embodiments, the perforated retaining sleeve 330 covers a portion of the outside diameter of elastomer composite 320 that has been bonded to the plug 326. In certain embodiments, there are two perforated retaining sleeves 330, one that covers a portion of the outside diameter of elastomer composite 320 that has been bonded to the head 324, and a second that covers a portion of the outside diameter of elastomer composite 320 that has been bonded to the plug 326. In this embodiment, the elastomer composite 320 can still compress and expand to dampen the pressure variations within the fluid. In certain embodiments the perforated retaining sleeve 330 is affixed to the head 324 and the plug 326, and extends a distance that is equal to the internal length of the cylinder 302.

In certain embodiments, the perforated retaining sleeve 330 is welded to the head 324 as well as to the plug 326. The elastomer composite 320 cannot extend, shorten or expand, thereby preventing the plug from moving up and down the length of the cylinder 302 of the pulsation control stabilizer 300A. The plug 326 is locked in place as the perforated retaining sleeve 330 is anchored to the plug 326 and the head 324 that is affixed to the top ring 304 of the pulsation control stabilizer 300A. The perforations of the perforated retaining sleeve 330 allow the elastomer composite 320 to continue to compress and expand to dampen the pressure variations within the fluid, while maintaining a linear resistance to the hoop and axial stress loads.

In certain embodiments, the perforated retaining sleeve 330 allows an increased pre-charge pressure of the cartridge 300C. The closer the internal pressure of the cartridge 300C is to the fluid in the pipeline, the more efficient the pulsation control stabilizer 300A is at dampening pulsations in the fluid. For example, the fluid transmits the contained pulsations to the gas within the cartridge 300C, dependent on the pre-charge of the gas within the cartridge 300C, and the pressure of the piping system when in operation. It is noted that cartridge 300C in the previous example can be interchanged to cartridge 300A, 300B, or 300D. For example, if the fluid in the pipeline is 2,500 PSI, and the pre-charge of the cartridge is 500 PSI, then the ability to dampen is minimal. In another example, if the fluid in the pipeline is 2,500 PSI, and the pre-charge of the cartridge is 1,000 PSI, the ability to dampen is significantly improved. The perforated retaining sleeve 330 reduces the axial and hoop stress applied across the elastomer composite 320, as the stresses are transferred to the perforated retaining sleeve 330. Since the axial and hoop stress is transferred to the perforated retaining sleeve 330, a larger pre-charge pressure to the cartridge 300C is attainable. Also, the possibility for failure of the elastomer composite 320, are reduced as well as the possibility for failure between the bond between the elastomer composite 320 and the plug 326 or head 324. When the perforated retaining sleeve 330 is continuous from the head 324 to the plug 326, the sheer failure of the bond between the elastomer composite 320 and the plug 326, is almost entirely eliminated, as the elastomer composite 320 is prevented from stretching along the bond at the plug 326 or head 324.

In certain embodiments, the perforated retaining sleeve 330 is a metal component that can withstand the various environmental factors of the closed pumping system. Environmental factors can include the high operating pressure, the corrosive nature of the fluid, the temperature of the fluid, and the like. For example, the perforated control retaining sleeve 330 is stainless steel, chrome, nickel, iron, copper, cobalt, molybdenum, tungsten, titanium, or the like. In another example, the perforated retaining sleeve 330 has a coating that protects the material of the perforated retaining sleeve 330 from environmental factors of the closed pumping system. The thickness of the perforated retaining sleeve 330 is dependent on the material used and the pressure of the system and the pre-charge pressure of the cartridge.

The perforations of the perforated retaining sleeve 330 are holes through the cylindrical sheet of metal. In certain embodiments, the perforations of the perforated retaining sleeve 330 can be of the same size and the same shape. In certain embodiments, the perforations of the perforated retaining sleeve 330 can be of different diameters or different shapes or both. For example, the perforations can be square, rectangular, circular, or triangular, and the like. In another example, the perforations can be different sizes. Each perforation can be a different size. A portion of the perforations can be a different size than other portions of the perforations. In certain embodiments, the perforations are evenly distributed along the perforated retaining sleeve 330. In certain embodiments, the perforations are irregularly distributed along the perforated retaining sleeve 330. In certain embodiments, there is a correlation between the size of the perforations, the thickness of the retaining sleeve, the type of material used for the retaining sleeve, the operating pressure of the system, the pre-charge pressure, and the like.

FIG. 4 illustrates a cut away view of a pulsation control stabilizer according to various embodiments of the present disclosure. FIG. 4 illustrates a pulsation control stabilizer 400. Pulsation control stabilizer 400 is similar the pulsation control stabilizer 300A of FIG. 3A, the cartridge 300C of FIG. 3C, and the pulsation control stabilizers 225 and 235 of FIG. 2. Pulsation control stabilizer 400 includes cylinder 402 (similar to the cylinder 302 of FIG. 3A), a top ring 404 (similar to the top ring 304 of FIG. 3A), a flange connection 408 (similar to the flange connection 308 of FIG. 3A), an elastomer composite 420 (similar to the elastomer composite 320 of FIG. 3B), an internal volume 422 of the elastomer composite 420 (similar to the internal volume 322 of FIG. 3B), a head 424 (similar to the head 324 of FIGS. 3B and 3C), a plug 426 (similar to the plug 326 of FIGS. 3B and 3C), a perforated retaining sleeve 430 (similar to the perforated retaining sleeve 330 of FIG. 3C), an opening 440 to the fluid within the piping system, and an annulus 442.

The cartridge, similar to cartridge 300B of FIG. 3B, includes the elastomer composite 420, the head 424, the plug 426, and the perforated retaining sleeve 430. In certain embodiments, the cartridge 400 also includes crimping sleeves 328A and 328B, external crimping sleeves 328C and 328D, or crimping sleeves 328A, 328B, 328C and 328D (both between the cartridge 300B and the retaining sleeve 330 and external to the retaining sleeve 330) in similar locations as discussed with respect to FIGS. 3B and 3D. The cartridge is inserted inside the cylinder 402, and sealed to prevent the escape of the fluid from the piping system. In certain embodiments, the top ring 404 and the head 424 fit flush.

Pulsation control stabilizer 400 sits on a pipe in a piping system and is connected at the flange connection 408. The fluid enters the pulsation control stabilizer 400 through opening 440. The fluid the travels upwards and downwards inside the cylinder 402. The annulus 442 is the area between the cartridge and the inner circumference of the cylinder 402. The annulus 442 is an area that allows the fluid to travel inside the cylinder and through the perforated retaining sleeve 430. The fluid traveling inside the cylinder 402 and outside the cartridge transmits pressure pulsations to the gas filled cartridge. The gas filed cartridge compresses and expands as the cartridge absorbs and exudes the pressure created by the pulsations from the pump. By absorbing the pressure pulsations, the pressure pulsations within the fluid are dampened.

FIG. 5 illustrates an exploded view of a pulsation control stabilizer 500 according to various embodiments of the present disclosure. The pulsation control stabilizer 500 of FIG. 5 includes cylinder 502 (similar to the cylinder 302 of FIG. 3A and the cylinder 402 of FIG. 4), a top ring 504 (similar to the top ring 304 of FIG. 3A and top ring 404 of FIG. 4), a head 524 (similar to the head 324 of FIGS. 3B and 3C, and the head 424 of FIG. 4), a perforated retaining sleeve 530 (similar to the perforated retaining sleeve 330 of FIG. 3C and the perforated retaining sleeve 430 of FIG. 4), a bleeder valve 510 (similar to the bleeder valve 310 of FIG. 3A), and an O-Ring 512.

The O-Ring 512 acts as a mechanical gasket between the head 524 and the cylinder 502. The head 524 is threaded and is inserted into the top ring 504. In certain embodiments, the top ring 504 includes a screw clamp that locks the head 524 in place. The elastomer composite (similar to the elastomer composite 320 of FIG. 3B) is located behind the perforated retaining sleeve 330.

Figure 6:
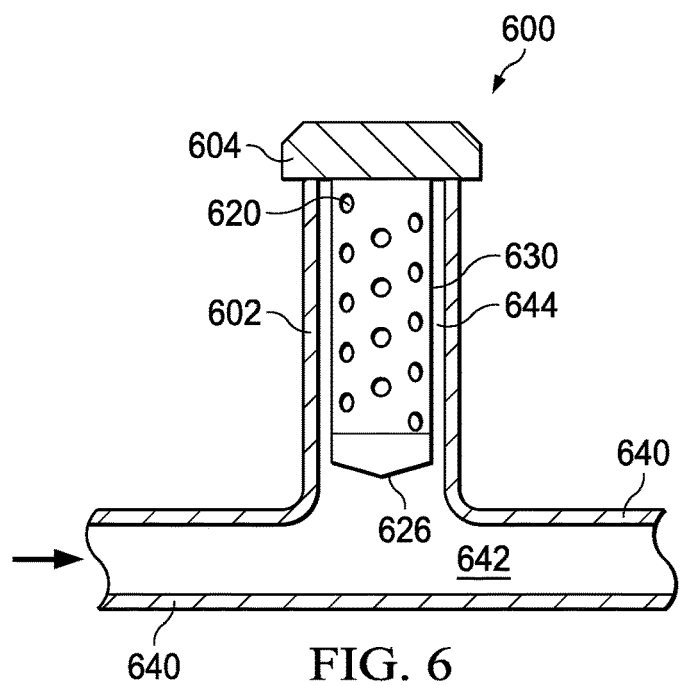
FIG. 6 illustrates a partial cross sectional view of a fluid delivery and pulsation dampening system according to various embodiments of the present disclosure.

FIG. 6 illustrates a partial cross sectional view of a fluid delivery and pulsation dampening system 600 according to various embodiments of the present disclosure. FIG. 6 illustrates a pipe 640 containing fluid 642 and a pulsation control stabilizer 602. The pulsation control stabilizer 602 includes a top ring 604 (similar to the top ring 304 of FIG. 3A, the top ring 404 of FIG. 4, and the top ring 504 of FIG. 5), a plug 626 (similar to the plug 326 of FIGS. 3B and 3C, and the plug 426 of FIG. 4), a perforated retaining sleeve 630 (similar to the perforated retaining sleeve 330 of FIG. 3C, the perforated retaining sleeve 430 of FIG. 4, and the perforated retaining sleeve 530 of FIG. 5), an elastomer composite 620 (similar to the elastomer composite 320 of FIG. B, and 420 of FIG. 4), and an annulus 644.

The pipe 640 and the annulus 644 are filled with the fluid 642. The fluid 642 moves through pipe 640 and the annulus 644, and contains pressure variations. The elastomer composite 620 compresses and expands as the pressure variations within the fluid 642 are dampened. The perforated retaining sleeve 630 provides structure and support to the elastomer composite 620, while the elastomer composite 620 is still able to dampen pressure variations within the fluid.

Figure 7:
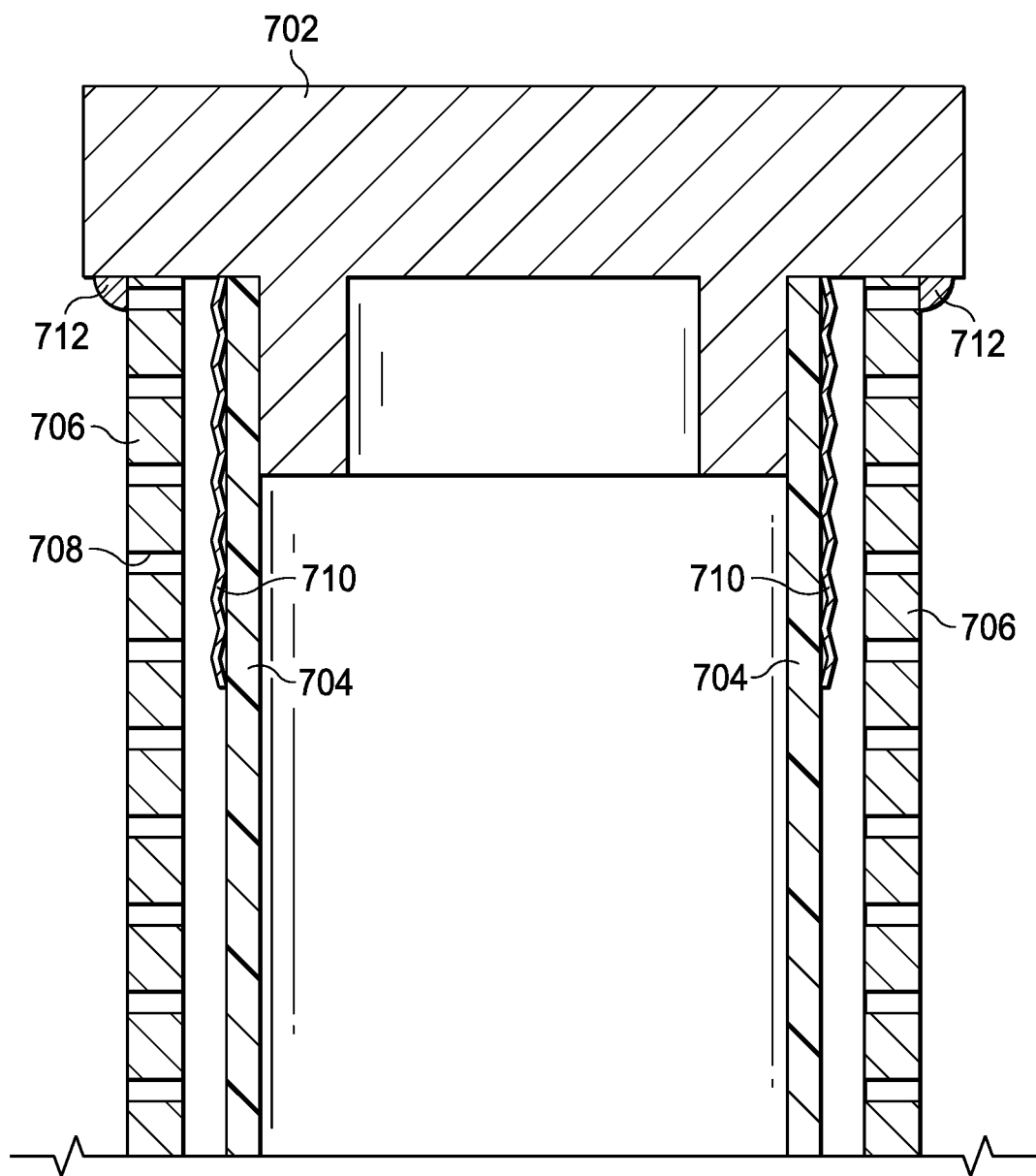
FIG. 7 illustrates a cross sectional view of a top portion of a pulsation control stabilizer cartridge with a perforated retraining sleeve according to various embodiments of the present disclosure.

FIG. 7 illustrates a cross sectional view of a top portion of a pulsation control stabilizer cartridge with a perforated retaining sleeve according to various embodiments of the present disclosure. The cross sectional view of the cartridge of FIG. 7 illustrates an example connection between the perforated retaining sleeve 706 and to the head 702. The perforated retaining sleeve 706 (similar to the perforated retaining sleeve 330 of FIG. 3C, the perforated retaining sleeve 430 of FIG. 4, the perforated retaining sleeve 530 of FIG. 5, and the perforated retaining sleeve 630 of FIG. 6) includes a head 702 (similar to the head 324 of FIGS. 3B and 3C, and the head 424 of FIG. 4, and the head 524 of FIG. 5), an elastomer composite 704 (similar to the elastomer composite 320 of FIG. B, and 420 of FIG. 4, the elastomer composite 620 of FIG. 6), and a crimping sleeve 710. The perforated retaining sleeve 706 includes holes 708.

The elastomer composite 704 is bonded to the head 702. In certain embodiments, the head has a valve allowing gas to fill the elastomer composite 704, in order to pressurize the cartridge. A crimping sleeve 710 is located around the circumference of the elastomer composite 704. The crimping sleeve 710 is located near the shoulder of the head 702 and extends down the elastomer composite 704 for a predetermined length. In certain embodiments the predetermined length is the length that the head 702 extends down the elastomer composite 704 towards the plug (not shown). The crimping sleeve 710 creates external pressure forces on top of the elastomer composite 704 and the head 702. In certain embodiments, the elastomer composite 704 is molded to the head 702 and the crimping sleeve 710 provides further security to the bond the elastomer composite 704 to the head 702. In certain embodiments, the crimping sleeve 710 is affixed external to the perforated retaining sleeve 706. For example, the elastomer composite 704 is affixed to the head 702, and the perforated retaining sleeve 706 surrounds the outer circumference of the elastomer composite 704, and the crimping sleeve 710 surrounds a portion of the outer circumference of the perforated retaining sleeve 706.

The perforated retaining sleeve 706 is positioned adjacent to the elastomer composite 704. In certain embodiments, the perforated retaining sleeve 706 fits against the elastomer composite 704. In certain embodiments, there is a gap between the perforated retaining sleeve 706 and the elastomer composite 704. The perforated retaining sleeve 706 is adjacent to and touches the head 702. A weld connection 712 bonds the head 702 to the perforated retaining sleeve 706. The weld connection 712 creates a strong bond between the two components.

FIGS. 8A-8G illustrate cross sectional views of a bottom portion of a pulsation control stabilizer cartridge with a perforated retaining sleeve according to various embodiments of the present disclosure. FIGS. 8A-8G illustrate different embodiments 800A-800G of bonding a perforated retaining sleeve to the plug of the cartridge. The perforated retaining sleeve 806 (similar to the perforated retaining sleeve 330 of FIG. 3C, the perforated retaining sleeve 430 of FIG. 4, the perforated retaining sleeve 530 of FIG. 5, the perforated retaining sleeve 630 of FIG. 6, and the perforated retaining sleeve 706 of FIG. 7) includes an elastomer composite 804 (similar to the elastomer composite 320 of FIG. 3B, and 420 of FIG. 4, the elastomer composite 620 of FIG. 6, and the elastomer composite 704 of FIG. 7), a crimping sleeve 810 (similar to the crimping sleeve 710 of FIG. 7). The perforated retaining sleeve 806 also includes holes 808.

Figure 8A:
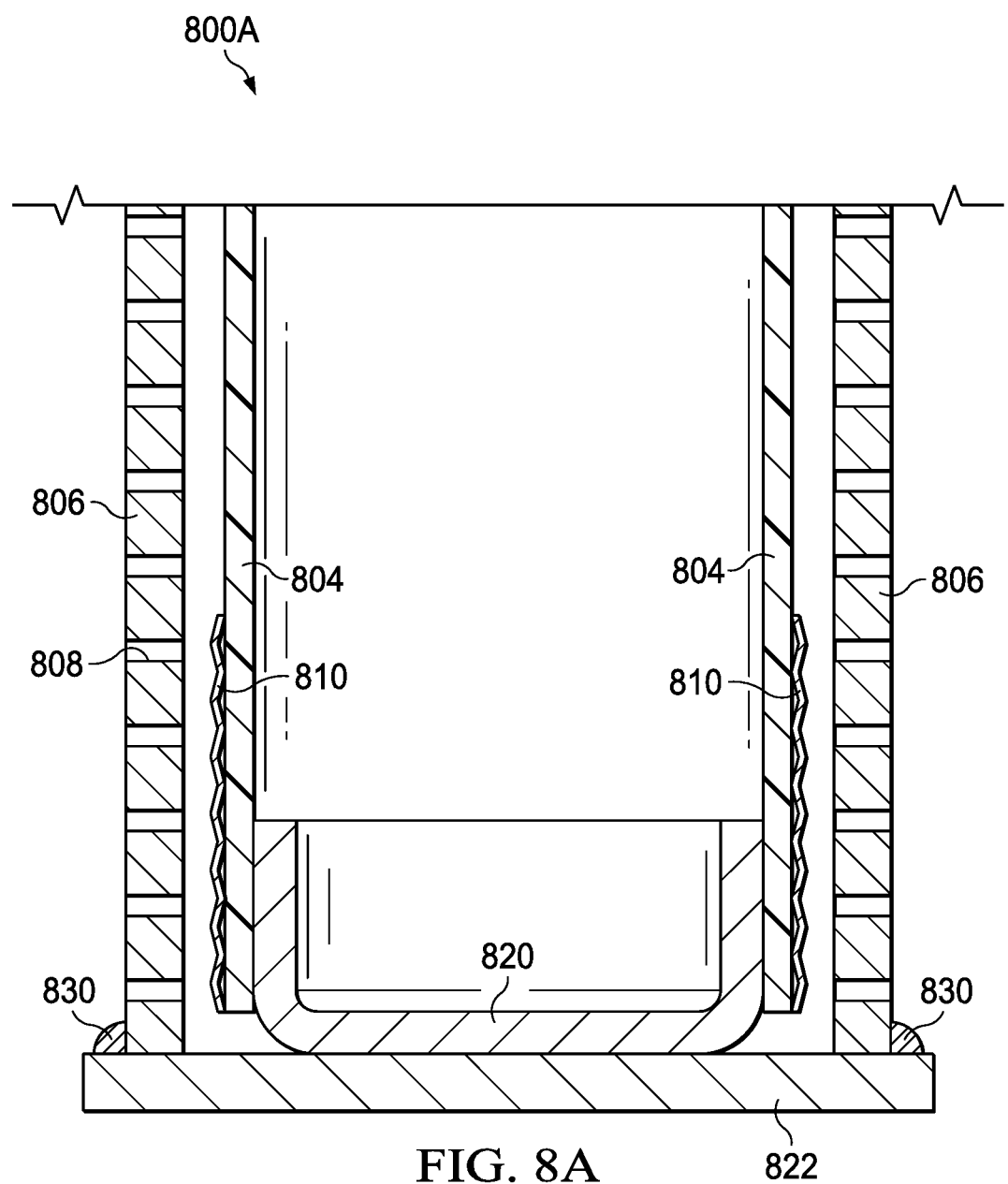

FIG. 8A illustrates the perforated retaining sleeve 806 affixed to a retaining plate 822 via weld connection 830. The retaining plate is positioned below the plug 820 (similar to the plug 326 of FIGS. 3B and 3C, the plug 426 of FIG. 4, and the plug 626 of FIG. 6). The elastomer composite 804 is affixed to the plug 820. In certain embodiments, the elastomer composite 804 is molded to the plug 820 and secured to the elastomer composite 804 to the plug 820 using the crimping sleeve 810. In certain embodiments, the retaining plate 822 is a metallic disk with a diameter larger than the perforated retaining sleeve 806. In certain embodiments, the weld connection 830 goes around the circumference of the perforated retaining sleeve 806 affixing the perforated retaining sleeve 806 to the retaining plate 822. The retaining plate 822 is positioned across the diameter of perforated retaining sleeve 806 and touches the bottom of the plug 820. The retaining plate 822 prevents the elastomer composite 804 from expanding beyond the length of the perforated retaining sleeve 806. A portion of the axial stress is transferred onto the perforated retaining sleeve 806, the retaining plate 822, and the weld connection 830 that connects perforated retaining sleeve 806 to the retaining plate 822. The weld connection 830 is strong enough to withstand any force applied by the plug 820 onto the retaining plate 822 due to the elastomer composite 804 elongating due to pre-charge pressures and pressure variations in the fluid. The retaining plate 822 is designed to withstand any impacts from the plug if the plug as the elastomer composite 804 expands due to the pressure variations of the fluid. In certain embodiments, the retaining plate 822 is a material similar to the material of the perforated retaining sleeve 806.

The elastomer composite 804 cannot expand beyond the length of the perforated retaining sleeve 806, as the perforated retaining sleeve 806 is (i) affixed to a retaining plate 822 via weld connection 830 on one end and (ii) the head (not shown in FIG. 8A) on the other end. The plug 820 is prevented from moving beyond the length of the perforated retaining sleeve 806, as the plug 820 is stopped by the retaining plate 822. By preventing the plug 820 from moving beyond the length of the perforated retaining sleeve 806, less hoop and axial stress is applied across the length of the elastomer composite 804, and less shear and hoop stresses are applied to the bond between elastomer composite 804 and plug 820, since the elastomer composite 804 cannot expand beyond the length of the perforated retaining sleeve 806. Similarly, by limiting the movement of the head (not shown) due to the perforated retaining sleeve 806, results in less hoop and axial stress that is applied to the bond of the elastomer composite 804 head, and across the length of the elastomer composite 804, since the elastomer composite 804 is prevented from over expanding.

Figure 8B:
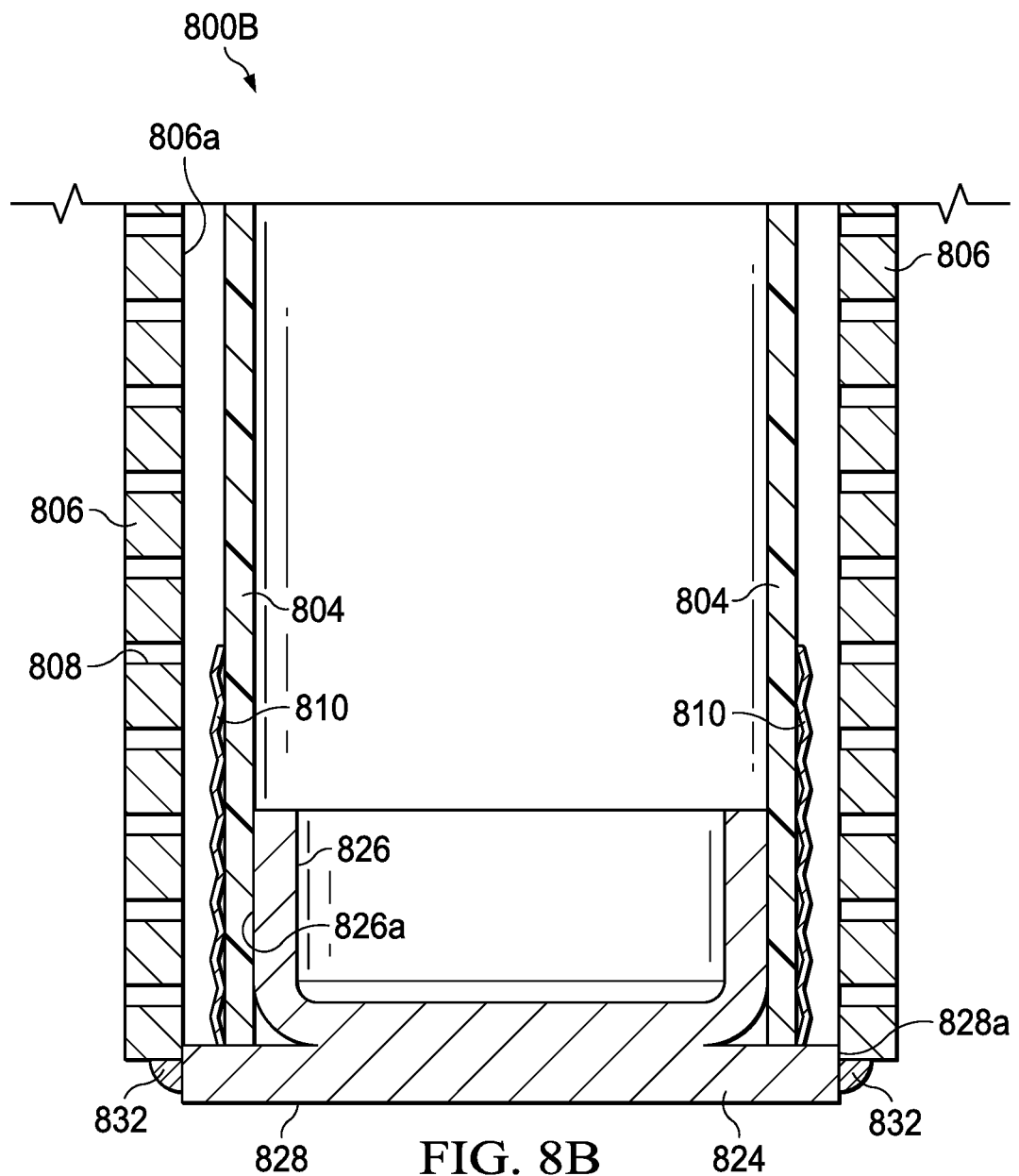
Figure 8C:
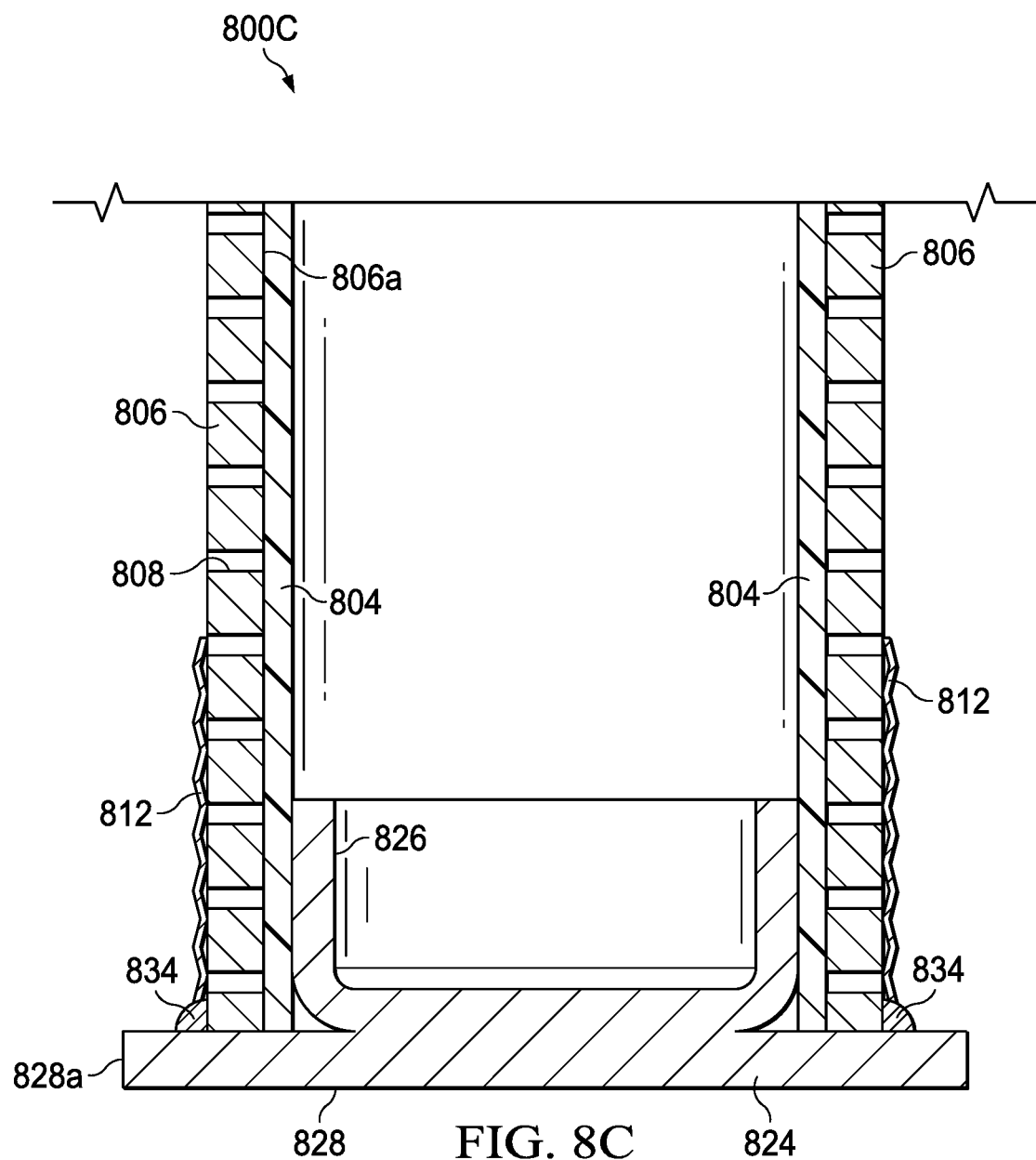
Figure 8D:
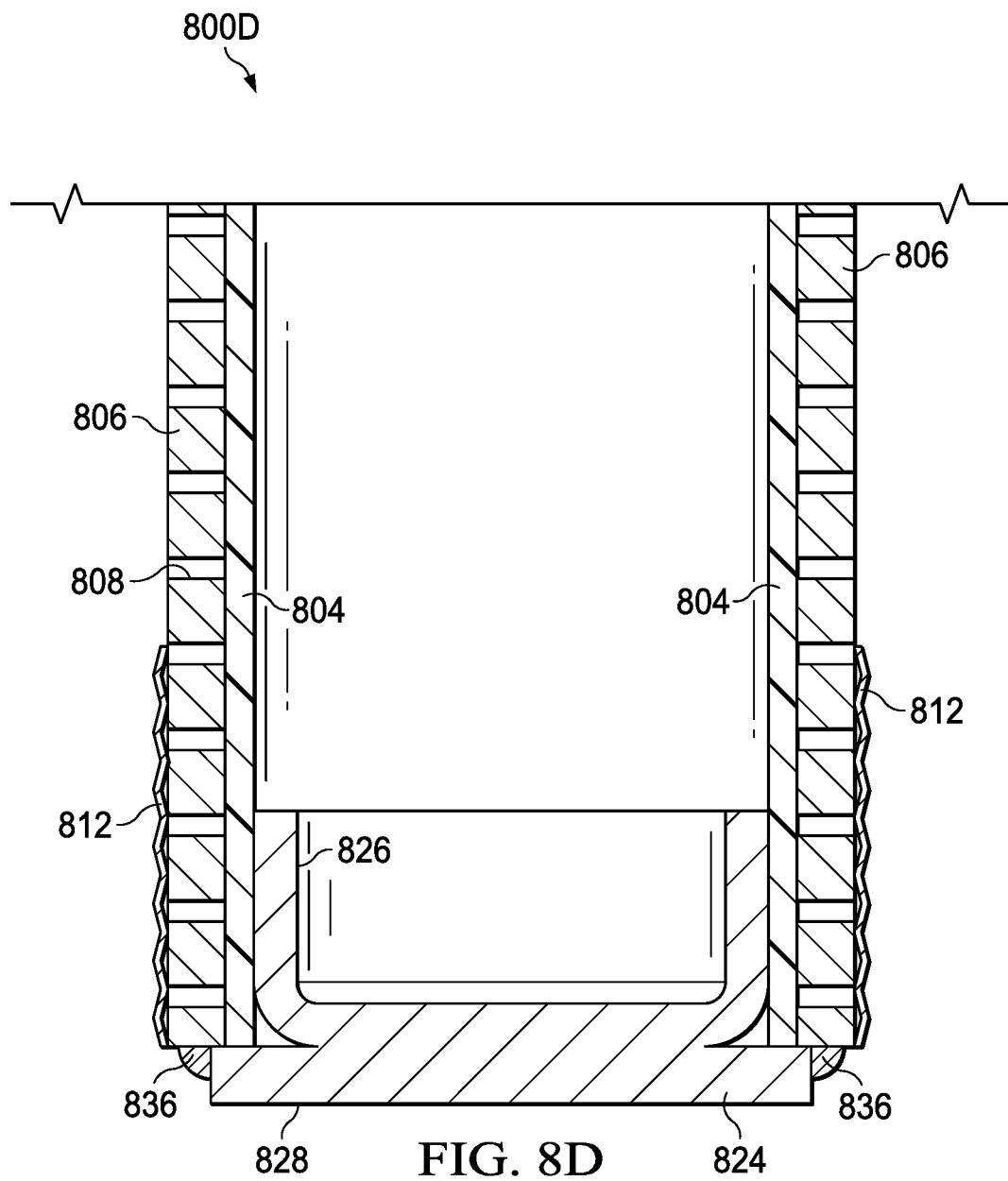

FIG. 8B illustrates a pulsation control stabilizer cartridge with a perforated retaining sleeve 800B in which the perforated retaining sleeve 806 is affixed directly to the plug 824. The plug 824 is manufactured as a single element with a cup 826 similar to the plug 820 and a base 828 similar to the retaining plate 822 of FIG. 8A. The elastomer composite 804 is affixed to the cup 826 of the plug 824. In certain embodiments, the elastomer composite 804 is molded to the plug 824 and the crimping sleeve 810 secures the elastomer composite 804 to the outside 826a of the cup 826 of the plug 824. The plug 824 is manufactured with a base 828. The base 828 of the plug 824 is a similar diameter to the inside diameter of the perforated retaining sleeve 806. For example, the plug 824 can be positioned within an inside circumference 806a of the perforated retaining sleeve 806. The weld connection 832 is located on the bottom of the perforated retaining sleeve 806 along the outside circumference 828a of the base 828 of the plug 824. In certain embodiments, the weld connection 832 goes around the circumference of the perforated retaining sleeve 806 affixing the perforated retaining sleeve 806 to the plug 824.

The plug 824 is unable to move as the plug 824 is affixed to the perforated retaining sleeve 806 via weld connection 832 as well as a similar connection to head. By preventing the plug 824 from moving, there is less hoop and axial stress applied across the length of the elastomer composite 804, and less shear and hoop stresses are applied to the bond between elastomer composite 804 and plug 820, since the plug cannot move up or down in response to the elastomer composite 804 expanding and contracting due to pre-charge pressures and pressure variations in the fluid. Similarly, by limiting the movement of the head results in less hoop and axial stress that is applied across the length of the elastomer composite 804 and to the bond between elastomer composite 804 and head, since the elastomer composite 804 is prevented from over expanding due to pre-charge pressures and pressure variations in the fluid. For example, when a pre-charge pressure or pressure variation of the fluid causes the elastomer composite 804 to expand or contract, the plug 824 is rigidly affixed to the perforated retaining sleeve 806 via a weld connection 832, and the axial load is carried against the plug 824, the perforated retaining sleeve 806, and the weld connection 832. Similarly, the elastomer composite 804 can expand to the diameter of the perforated retaining sleeve 806. When the elastomer composite 804 expands to the width of the perforated retaining sleeve 806, the hoop stress applied across the elastomer composite 804 is transferred onto the perforated retaining sleeve 806. Shear and hoop stresses are reduced in the bond of elastomer composite 804 and plug 824. Similar affects occur at head not shown.

FIG. 8C illustrates a pulsation control stabilizer cartridge with a perforated retaining sleeve 800C in which the perforated retaining sleeve 806 is affixed directly to the plug 824 via weld connection 834. The plug 824 is manufactured as a single element similar to the plug 820 and the retaining plate 822 of FIG. 8A. The elastomer composite 804 is affixed to the plug 824. In certain embodiments, the elastomer composite 804 is molded to the plug 824. The perforated retaining sleeve 806 is surrounds the elastomer composite 804 and the crimping sleeve 812 secures the perforated retaining sleeve 806 and the elastomer composite 804 to the plug 824. The plug 824 is manufactured with a base 828. Crimping sleeve 812 is similar to the crimping sleeve 328D shown in FIG. 3D. In certain embodiments the length of the crimping sleeve 812 is equal to or taller than the height of the plug 824, where the height of the plug 824 is the distance the plug 824 extends towards the head (not shown in FIG. 8C) within the elastomer composite 804. The base 828 of the plug 824 is larger than the outside diameter of the perforated retaining sleeve 806. For example, the base 828 of plug 824 extends the diameter of the perforated retaining sleeve 806. The weld connection 834 is located on along the bottom edge of the perforated retaining sleeve 806 along the shoulder of the base 828 of the plug 824. In certain embodiments, the weld connection 834 goes around the circumference of the perforated retaining sleeve 806 affixing the perforated retaining sleeve 806 to the plug 824.

The plug 824 is unable to move since the plug 824 is affixed to the perforated retaining sleeve 806 via weld connection 834 as well as a similar weld connection to head not shown. By preventing the plug 824 from moving, there is less hoop and axial stress applied across the length of the elastomer composite 804 and less shear and hoop stresses are applied to the bond between elastomer composite 804 and plug 820, since the plug 824 cannot move up or down in response to the elastomer composite 804 expanding and contracting due to pre-charge pressures and pressure variations in the fluid. Similarly, by limiting the movement of the head (not shown) results in less hoop and axial stress that is applied across the length of the elastomer composite 804 and to the bond between elastomer composite 804 and head, since the elastomer composite 804 is prevented from over expanding due to pre-charge pressures and pressure variations in the fluid. For example, when a pre-charge pressure or pressure variation of the fluid causes the elastomer composite 804 to expand or contract, the plug 824 is rigidly affixed to the perforated retaining sleeve 806 via weld connection 834, and the axial load is carried against the plug, the perforated retaining sleeve 806, and the weld connection 834. Similarly, the elastomer composite 804 can only expand to the diameter of the perforated retaining sleeve 806. When the elastomer composite 804 expands to the width of the perforated retaining sleeve 806, the hoop stress applied across the elastomer composite 804 is transferred onto the perforated retaining sleeve 806. Shear and hoop stresses are reduced in the bond of elastomer composite 804 and plug 824. Similar affects occur at head not shown.

FIG. 8D illustrates a pulsation control stabilizer cartridge with a perforated retraining sleeve 800D in which the perforated retaining sleeve 806 is bonded directly to the plug 824 via weld connection 836. The plug 824 is manufactured as a single element similar to the plug 820 and the retaining plate 822 of FIG. 8A. The elastomer composite 804 is affixed to the plug 824. In certain embodiments, the elastomer composite 804 is molded to the plug 824. The perforated retaining sleeve 806 surrounds the elastomer composite 804. The crimping sleeve 812 secures the perforated retaining sleeve 806 and the elastomer composite 804 to the plug 824. The crimping sleeve 812 is similar to the crimping sleeve 328D shown in FIG. 3D. In certain embodiments the length of the crimping sleeve 812 is equal to or taller than the height of the plug 824, where the height of the plug 824 is the distance the plug 824 extends towards the head (not shown in FIG. 8D) within the elastomer composite 804. The plug 824 is manufactured with a base 828. The base 828 of the plug 824 has a diameter that is approximately the same diameter as the perforated retaining sleeve 806. In certain embodiments, the base 828 of the plug 824 has a diameter that allows the perforated retaining sleeve 806 to overhang the base 828 of the plug 824 enough for the weld connection 836. That is, a portion of the perforated retaining sleeve 806 sits on the base 828 of the plug 824 and the remainder of the perforated retaining sleeve 806 overhangs the base 828 of the plug 824. The weld connection 836 is located between the portion of the overhanging perforated of the perforated retaining sleeve 806 and the base 828 of the plug 824. In certain embodiments, the weld connection 836 goes around the circumference of the perforated retaining sleeve 806 affixing the perforated retaining sleeve 806 to the plug 824.

The plug 824 is unable to move as the plug 824 is affixed to the perforated retaining sleeve 806 via weld connection 836. By preventing the plug 824 from moving, there is less hoop and axial stress applied across the length of the elastomer composite 804 and less shear and hoop stresses are applied to the bond between elastomer composite 804 and plug 820, since the plug 824 cannot move up or down in response to the elastomer composite 804 expanding and contracting due to pressure variations in the fluid. Similarly, by limiting the movement of the head (not shown) results in less hoop and axial stress that is applied across the length of the elastomer composite 804 and to the bond between elastomer composite 804 and head, since the elastomer composite 804 is prevented from over expanding due to pre-charge pressures and pressure variations in the fluid. For example, when a pressure variation of the fluid causes the elastomer composite 804 to expand or contract, the plug 824 is rigidly affixed to the perforated retaining sleeve 806 via weld connection 836, and the axial load is carried against the plug, the perforated retaining sleeve 806, and the weld connection 836. Similarly, the elastomer composite 804 can only expand to the diameter of the perforated retaining sleeve 806. When the elastomer composite 804 expands to the width of the perforated retaining sleeve 806, the hoop stress applied across the elastomer composite 804 is transferred onto the perforated retaining sleeve 806. Shear and hoop stresses are reduced in the bond of elastomer composite 804 and plug 824. Similar affects occur at head not shown.

Figure 8G:
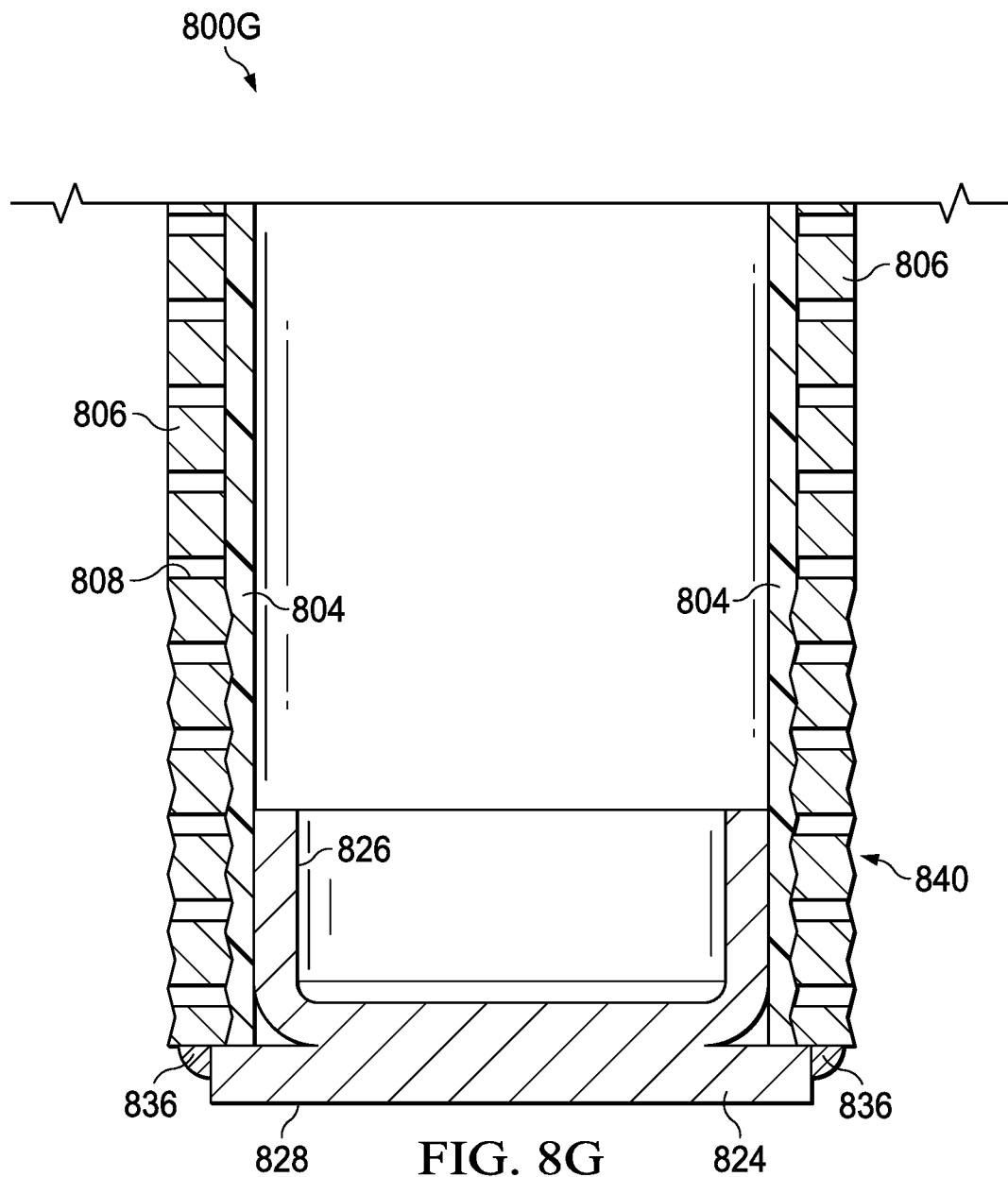

FIG. 8E illustrates a pulsation control stabilizer cartridge with a perforated retaining sleeve 800E in which a perforated retaining sleeve 806 is bonded directly to the plug 824 via weld connection 836 and molded to the elastomer composite 804. FIG. 8F illustrates a pulsation control stabilizer cartridge with a perforated retaining sleeve 800F in which a crimping sleeve 838 is formed into the outer diameter of the elastomer composite 804, with the perforated retaining sleeve 806 bonded directly to the plug 824 via weld connection 836. FIG. 8G illustrates a pulsation control stabilizer cartridge with a perforated retaining sleeve 800G in which a perforated retaining sleeve 806 is bonded directly to the plug 824 via weld connection 836 and molded to the elastomer composite 804 and the perforated retaining sleeve 806 is further crimped on each end of rubber composite 804 to enhance the bond between rubber composite 804 and the cylindrical surface of Plug 826. Similar features also take place at the head (not shown)"). The plug 824 is manufactured as a single element similar to the plug 820 and the retaining plate 822 of FIG. 8A. The elastomer composite 804 is affixed to the plug 828. In certain embodiments, the elastomer composite 804 is molded to the plug 828. The perforated retaining sleeve 806 surrounds the elastomer composite 804. The perforated retain sleeve 806 is crimped 840 to secure retaining sleeve 806 and the elastomer composite 804 to the plug 828. In certain embodiments, the length of the crimp 840 is equal to or taller than the height of the plug 828, where the height of the plug 824 is the distance the plug 824 extends towards the head opposite plug 824 within the elastomer composite 804. The crimp 840 is represented by the saw tooth pattern in the perforated retaining sleeve 806 The plug 824 is manufactured with a base 828. The base 828 of the plug 824 has a diameter that is approximately the same diameter as the perforated retaining sleeve 806. In certain embodiments, the base 828 of the plug 824 has a diameter that allows the perforated retaining sleeve 806 to overhang the base 828 of the plug 824 enough for the weld connection 836. That is, a portion of the perforated retaining sleeve 806 sits on the base 828 of the plug 824 and the remainder of the perforated retaining sleeve 806 overhangs the base 828 of the plug 828. The weld connection 836 is located between the portion of the overhanging perforated of the perforated retaining sleeve 806 and the base 828 of the plug 828. In certain embodiments, the weld connection 836 goes around the circumference of the perforated retaining sleeve 806 affixing the perforated retaining sleeve 806 to the plug 828.

The plug 824 is unable to move as the plug 824 is affixed to the perforated retaining sleeve 806 via weld connection 836. By preventing the plug 824 from moving, there is less hoop and axial stress applied across the length of the elastomer composite 804 and less shear and hoop stresses are applied to the bond between elastomer composite 804 and plug 820, since the plug 824 cannot move up or down in response to the elastomer composite 804 expanding and contracting due to pressure variations in the fluid. Similarly, by limiting the movement of the head (not shown) results in less hoop and axial stress that is applied across the length of the elastomer composite 804 and to the bond between elastomer composite 804 and head, since the elastomer composite 804 is prevented from over expanding due to pre-charge pressures and pressure variations in the fluid. For example, when a pressure variation of the fluid causes the elastomer composite 804 to expand or contract, the plug 824 is rigidly affixed to the perforated retaining sleeve 806 via weld connection 836, and the axial load is carried against the plug, the perforated retaining sleeve 806, and the weld connection 836. Similarly, the elastomer composite 804 can only expand to the diameter of the perforated retaining sleeve 806. When the elastomer composite 804 expands to the width of the perforated retaining sleeve 806, the hoop stress applied across the elastomer composite 804 is transferred onto the perforated retaining sleeve 806. Shear and hoop stresses are reduced in the bond of elastomer composite 804 and plug 826. Similar affects occur at head not shown.

Although the figures illustrate different examples of user equipment, various changes may be made to the figures. For example, the pulsation control stabilizer can include any number of each component in any suitable arrangement. In general, the figures do not limit the scope of this disclosure to any particular configuration(s). Moreover, while figures illustrate operational environments in which various pulsation control stabilizer features disclosed in this patent document can be used, these features can be used in any other suitable system.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A gas charged cartridge, comprising: a head on a first end of the gas charged cartridge;
    an elastomer composite that absorbs pressure variations, the elastomer composite having a first end connected to the head;
    a plug inserted into a second end of the elastomer composite; and
    a perforated retaining sleeve affixed to the plug surrounding the elastomer composite.

2. The gas charged cartridge of claim 1, wherein the perforated retaining sleeve also is affixed to the head.

3. The gas charged cartridge of claim 1, wherein:
    the perforated retaining sleeve extends a partial length of the elastomer composite, and
    the gas charged cartridge further includes a crimping sleeve configured to secure the perforated retaining sleeve to the elastomer composite.

4. The gas charged cartridge of claim 1, further comprising:
    a crimping sleeve configured to secure the elastomer composite to the plug; and
    a retaining plate coupled to a base of the plug,
    wherein the perforated retaining sleeve is affixed to the retaining plate.

5. The gas charged cartridge of claim 1, wherein the plug includes a cup portion and a base portion extending from the cup portion.

6. The gas charged cartridge of claim 5, further comprising:
    a crimping sleeve configured to secure the elastomer composite to cup portion of the plug,
    wherein the perforated retaining sleeve is coupled to the base portion of the plug.

7. The gas charged cartridge of claim 6, wherein an inside circumference of the perforated retaining sleeve is coupled on an outside circumference of the base portion of the plug.

8. The gas charged cartridge of claim 6, wherein a base of the perforated retaining sleeve couples to an outside circumference of the base portion of the plug.

9. The gas charged cartridge of claim 5, further comprising:
    a crimping sleeve configured to secure the perforated retaining sleeve to the elastomer composite and secure both to the cup portion of the plug.

10. The gas charged cartridge of claim 1, wherein the perforated retaining sleeve is crimped to the elastomer composite.

11. A pulsation control dampener, comprising:
    a cylinder configured to receive a fluid for the pulsation control dampener;
    a gas charged cartridge inserted in the cylinder, the gas charged cartridge includes:
    a head on a first end of the gas charged cartridge;
    an elastomer composite that absorbs pressure variations the elastomer composite having a first end connected to the head;
    a plug inserted into a second end of the elastomer composite; and
    a perforated retaining sleeve affixed to the plug surrounding the elastomer composite.

12. The pulsation control dampener of claim 11, wherein the perforated retaining sleeve also is affixed to the head.

13. The pulsation control dampener of claim 11, wherein:
    the perforated retaining sleeve extends a partial length of the elastomer composite, and the gas charged cartridge further includes a crimping sleeve configured to secure the perforated retaining sleeve to the elastomer composite.

14. The pulsation control dampener of claim 11, wherein the gas charged cartridge further includes:
   a crimping sleeve configured to secure the elastomer composite to the plug, and
   a retaining plate coupled to a base of the plug,
   wherein the perforated retaining sleeve is affixed to the retaining plate.

15. The pulsation control dampener of claim 11, wherein the plug includes a cup portion and a base portion extending from the cup portion.

16. The pulsation control dampener of claim 15, wherein:
   the gas charged cartridge further includes a crimping sleeve configured to secure the elastomer composite to cup portion of the plug, and
   the perforated retaining sleeve is coupled to the base portion of the plug.

17. The pulsation control dampener of claim 16, wherein an inside circumference of the perforated retaining sleeve is coupled on an outside circumference of the base portion of the plug.

18. The pulsation control dampener of claim 16, wherein a base of the perforated retaining sleeve couples to an outside circumference of the base portion of the plug.

19. The pulsation control dampener of claim 15, wherein the gas charged cartridge further includes a crimping sleeve configured to secure the perforated retaining sleeve to the elastomer composite and secure both to the cup portion of the plug.

20. The pulsation control dampener of claim 11, wherein the perforated retaining sleeve is crimped to the elastomer composite.

* * * * *